US011714641B2

(12) United States Patent
Botman et al.

(10) Patent No.: US 11,714,641 B2
(45) Date of Patent: Aug. 1, 2023

(54) VECTOR GENERATING INSTRUCTION FOR GENERATING A VECTOR COMPRISING A SEQUENCE OF ELEMENTS THAT WRAPS AS REQUIRED

(71) Applicant: ARM LIMITED, Cambridge (GB)

(72) Inventors: François Christopher Jacques Botman, Cambridge (GB); Thomas Christopher Grocutt, Cambridge (GB); Neil Burgess, Cardiff (GB)

(73) Assignee: Arm Limited, Cambridge (GB)

( * ) Notice: Subject to any disclaimer, the term of this patent is extended or adjusted under 35 U.S.C. 154(b) by 48 days.

(21) Appl. No.: 16/471,185

(22) PCT Filed: Nov. 8, 2017

(86) PCT No.: PCT/GB2017/053355

§ 371 (c)(1),
(2) Date: Jun. 19, 2019

(87) PCT Pub. No.: WO2018/115807

PCT Pub. Date: Jun. 28, 2018

(65) Prior Publication Data

US 2019/0369995 A1 Dec. 5, 2019

(30) Foreign Application Priority Data

Dec. 22, 2016 (GB) ..................................... 1621965

(51) Int. Cl.

| | |
|---|---|
| ***G06F 9/30*** | (2018.01) |
| ***G06F 9/345*** | (2018.01) |
| ***G06F 9/355*** | (2018.01) |

(52) U.S. Cl.

CPC ........ *G06F 9/30036* (2013.01); *G06F 9/3013* (2013.01); *G06F 9/30043* (2013.01);

(Continued)

(58) Field of Classification Search

CPC .. G06F 9/30036; G06F 9/3552; G06F 9/3555; G06F 9/345; G06F 9/3013; G06F 9/30112; G06F 9/30043

See application file for complete search history.

(56) References Cited

U.S. PATENT DOCUMENTS

| | | | |
|---|---|---|---|
| 4,819,152 | A | 4/1989 | Deerfield et al. |
| 5,197,130 | A | 3/1993 | Chen et al. |

(Continued)

FOREIGN PATENT DOCUMENTS

| | | |
|---|---|---|
| CN | 102197369 | 9/2011 |
| CN | 103221936 | 7/2013 |

(Continued)

OTHER PUBLICATIONS

International Search Report and Written Opinion of the ISA for PCT/GB2017/053355, dated Feb. 9, 2018, 15 pages.

(Continued)

*Primary Examiner* — Jacob Petranek
(74) *Attorney, Agent, or Firm* — Nixon & Vanderhye P.C.

(57) ABSTRACT

An apparatus and method are provided for performing vector processing operations. In particular the apparatus has processing circuitry to perform the vector processing operations and an instruction decoder to decode vector instructions to control the processing circuitry to perform the vector processing operations specified by the vector instructions. The instruction decoder is responsive to a vector generating instruction identifying a scalar start value and wrapping control information, to control the processing circuitry to generate a vector comprising a plurality of elements. In particular, the processing circuitry is arranged to generate the vector such that the first element in the plurality is dependent on the scalar start value, and the values of the plurality of elements follow a regularly progressing sequence that is constrained to wrap as required to ensure (Continued)

that each value is within bounds determined from the wrapping control information. The vector generating instruction can be useful in a variety of situations, a particular use case being to implement a circular addressing mode within memory, where the vector generating instruction can be coupled with an associated vector memory access instruction. Such an approach can remove the need to provide additional logic within the memory access path to support such circular addressing.

20 Claims, 22 Drawing Sheets

(52) U.S. Cl.
CPC .......... *G06F 9/30112* (2013.01); *G06F 9/345* (2013.01); *G06F 9/3552* (2013.01); *G06F 9/3555* (2013.01)

(56) References Cited

U.S. PATENT DOCUMENTS 6,397,318 B1 * 5/2002 Peh .......................... G06F 5/10 711/217
2002/0194452 A1 * 12/2002 Catherwood ............. G06F 7/72 711/220
2005/0055543 A1 * 3/2005 Moyer ................ G06F 9/30036 712/225
2009/0313442 A1 * 12/2009 Moyer ................ G06F 9/30112 711/154
2010/0042808 A1 * 2/2010 Moyer ................ G06F 9/30145 712/22
2012/0060020 A1 * 3/2012 Gonion ............... G06F 9/30036 712/222
2013/0275727 A1 10/2013 Abraham et al.
2015/0234662 A1 8/2015 Tsung et al.
2016/0246599 A1 8/2016 Johnson
2021/0004349 A1 * 1/2021 Hung .................... G06F 9/3012

FOREIGN PATENT DOCUMENTS

CN 104199636 12/2014
CN 105378651 3/2016
CN 105474166 4/2016
TW 201007472 2/2010
TW 201349111 12/2013
WO 02/054227 7/2002

OTHER PUBLICATIONS

Search Report for GB1621965.1, dated Jun. 22, 2017, 6 pages.
Office Action for TW Application No. 106139279 dated Aug. 20, 2021 and English translation, 22 pages.
Office Action for JP Application No. 2019-531916 dated Oct. 26, 2021 and English translation, 9 pages.
Office Action for IN Application No. 201947027617 dated Dec. 21, 2021, 7 pages.
Office Action for KR Application No. 10-2019-7019243 dated Jan. 19, 2022 and English translation, 10 pages.
Notice of Allowance for CN Application No. 201780077872.X dated Dec. 5, 2022 and English translation, 10 pages.
K. Koutsomyti et al, "Accelerating speech coding standards through SystemC-synthesized SIMD and scalar accelerators" IEEE, Feb. 2006, 2 pages.

* cited by examiner

```
VLDR  Q1, [R0], #16
VMUL  Q0, Q1, Q2
VSHR  Q0, Q0, #1
```

1 beat / tick

|  | 1 | 2 | 3 | 4 | 5 | 6 |
|---|---|---|---|---|---|---|
| VIWDUP | A1 | A2 | A3 | A4 | | |
| VLDR | | | B1 | B2 | B3 | B4 |

2 beats / tick

|  | 1 | | 2 | | 3 | |
|---|---|---|---|---|---|---|
| VIWDUP | A1 | A2 | A3 | A4 | | |
| VLDR | | | B1 | B2 | B3 | B4 |

4 beats / tick

|  | 1 | | | | 2 | | | |
|---|---|---|---|---|---|---|---|---|
| VIWDUP | A1 | A2 | A3 | A4 | | | | |
| VLDR | | | | | B1 | B2 | B3 | B4 |

VECTOR GENERATING INSTRUCTION FOR GENERATING A VECTOR COMPRISING A SEQUENCE OF ELEMENTS THAT WRAPS AS REQUIRED

This application is the U.S. national phase of International Application No. PCT/GB2017/053355 filed 8 Nov. 2017 which designated the U.S. and claims priority to GB Patent Application No. 1621965.1 filed 22 Dec. 2016, the entire contents of each of which are hereby incorporated by reference.

The present technique relates to the field of data processing. More particularly, it relates to the processing of vector instructions.

Some data processing systems support processing of vector instructions for which a source operand or result value of the instruction is a vector comprising multiple elements. By supporting the processing of a number of distinct elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

At least some examples provide an apparatus comprising: processing circuitry to perform vector processing operations; and an instruction decoder to decode vector instructions to control the processing circuitry to perform the vector processing operations specified by the vector instructions; wherein the instruction decoder is responsive to a vector generating instruction identifying a scalar start value and wrapping control information, to control the processing circuitry to generate a vector comprising a plurality of elements, the processing circuitry being arranged to generate the vector such that the first element in said plurality is dependent on the scalar start value, and the values of the plurality of elements follow a regularly progressing sequence that is constrained to wrap as required to ensure that each value is within bounds determined from the wrapping control information.

At least some examples provide a method of operating an apparatus having processing circuitry to perform vector processing operations, and an instruction decoder to decode vector instructions to control the processing circuitry to perform the vector processing operations specified by the vector instructions, the method comprising: decoding a vector generating instruction identifying a scalar start value and wrapping control information; and responsive to said decoding, controlling the processing circuitry to generate a vector comprising a plurality of elements, the processing circuitry generating the vector such that the first element in said plurality is dependent on the scalar start value, and the values of the plurality of elements follow a regularly progressing sequence that is constrained to wrap as required to ensure that each value is within bounds determined from the wrapping control information.

At least some examples provide an apparatus comprising: processing means for performing vector processing operations; and instruction decoder means for decoding vector instructions to control the processing means to perform the vector processing operations specified by the vector instructions; the instruction decoder means for controlling, responsive to a vector generating instruction identifying a scalar start value and wrapping control information, the processing means to generate a vector comprising a plurality of elements, the processing means for generating the vector such that the first element in said plurality is dependent on the scalar start value, and the values of the plurality of elements follow a regularly progressing sequence that is constrained to wrap as required to ensure that each value is within bounds determined from the wrapping control information.

At least some examples provide a virtual machine computer program comprising program instructions to control a host data processing apparatus to provide an instruction execution environment corresponding to the apparatus discussed above.

A computer-readable storage medium storing the virtual machine computer program can also be provided. The storage medium may be a non-transitory storage medium.

The present technique will be described further, by way of example only, with reference to embodiments thereof as illustrated in the accompanying drawings, in which:

FIG. 1 is a block diagram of an apparatus in accordance with one embodiment;

FIG. 2 schematically illustrates fields provided within a vector generating instruction in accordance with one embodiment;

FIG. 3 schematically illustrates vectors of elements that can be generated for particular examples of the vector generating instruction in accordance with one embodiment;

FIG. 4 is a flow diagram illustrating the processing performed when executing a vector generating instruction in accordance with one embodiment;

FIG. 5 schematically illustrates how a vector generated by the vector generating instruction may be used as an input to a vector access instruction to identify circular buffers within the memory address space in accordance with one embodiment;

FIG. 6 is a block diagram illustrating in more detail the arrangement of the vector generating circuitry of FIG. 1 in accordance with one embodiment;

FIGS. 7A to 7C schematically illustrate the arrangement of the adder circuitry and modification circuitry of FIG. 6 in accordance with three example embodiments;

Figure 11:
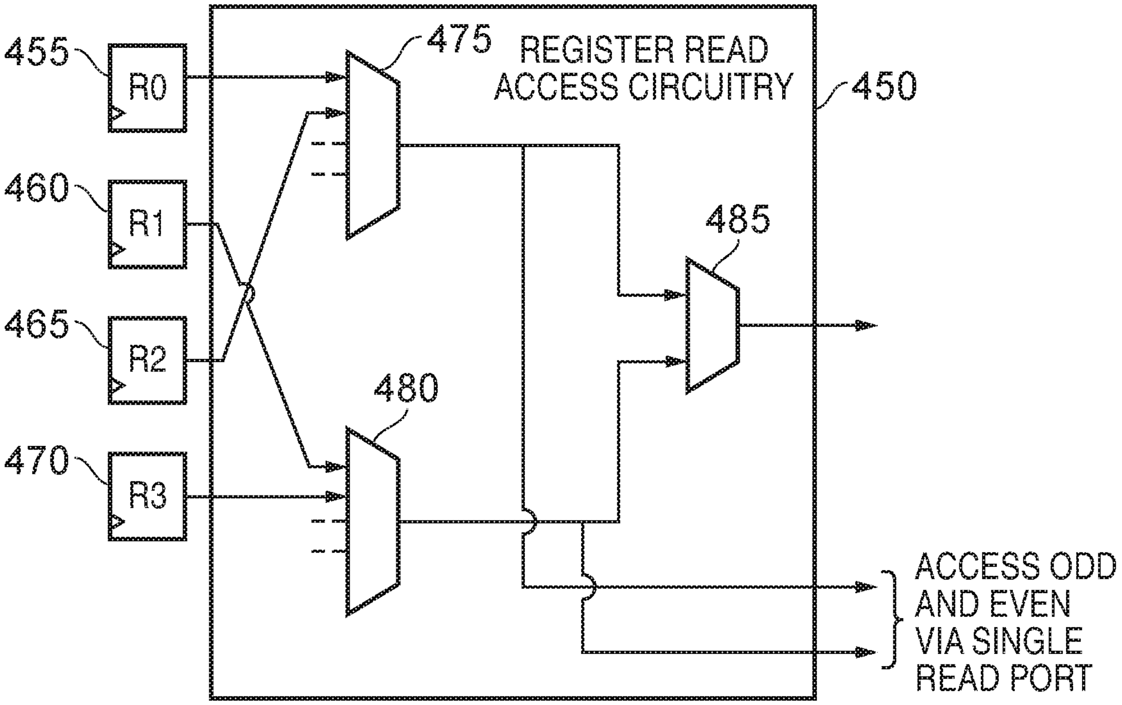
Figure 12:
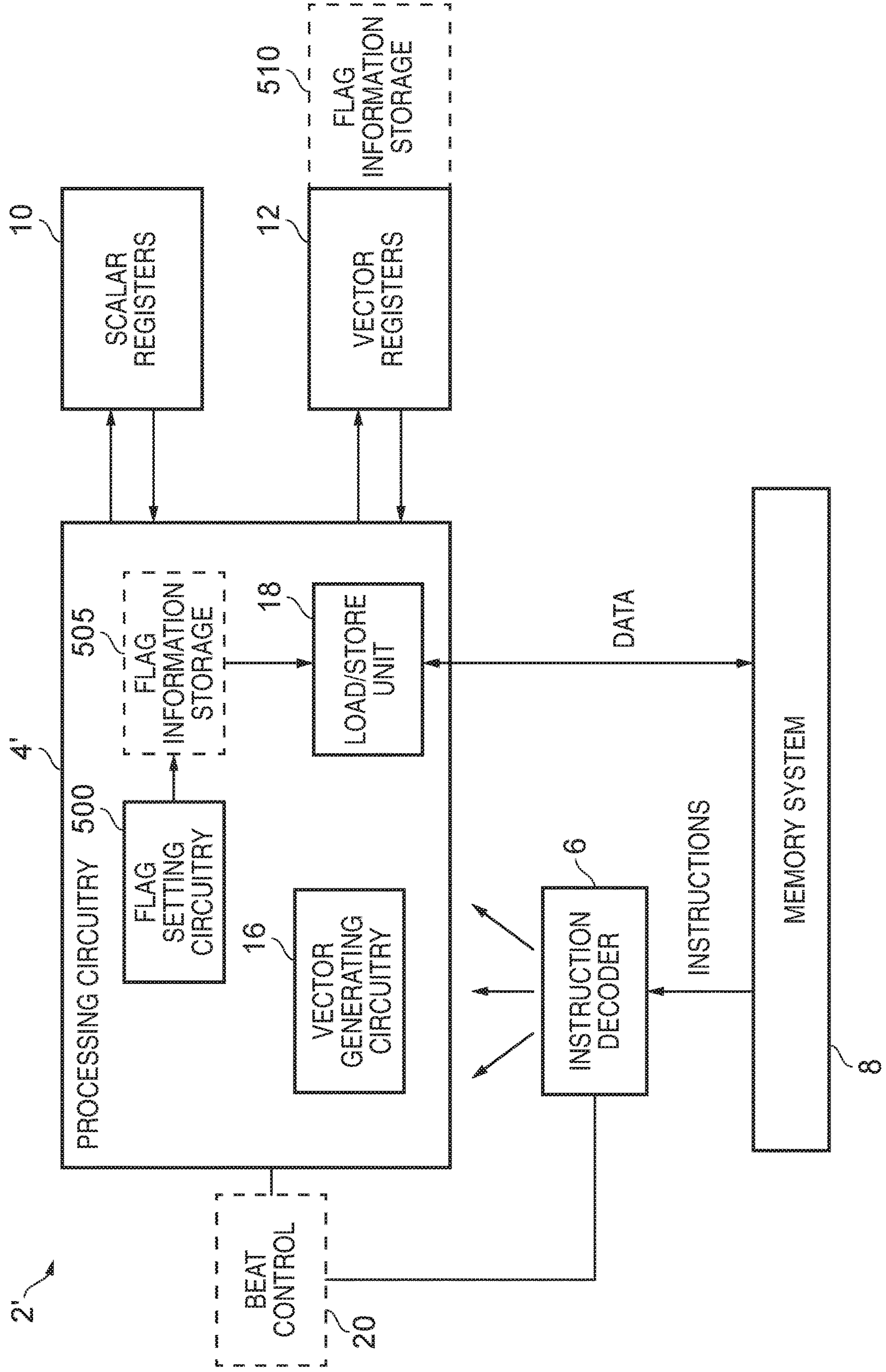
Figure 13A:
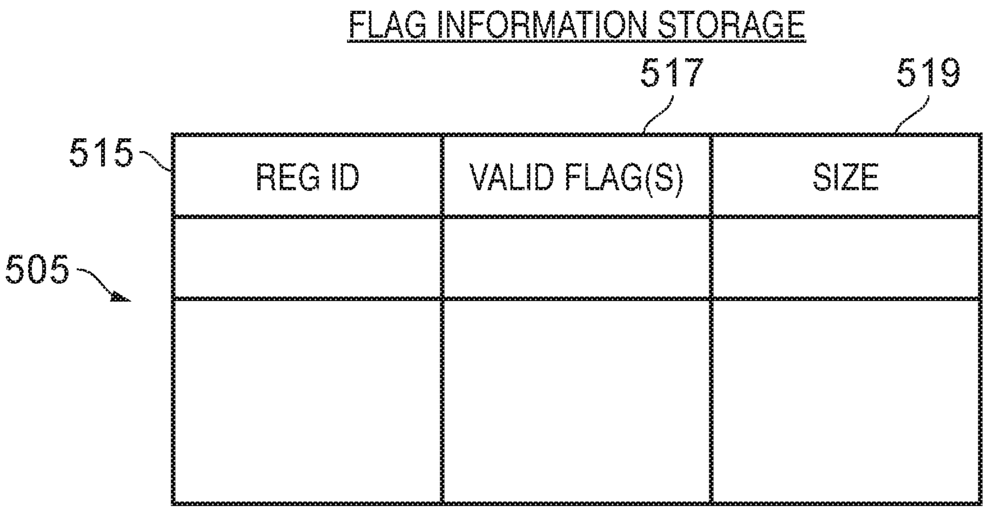
Figure 13B:
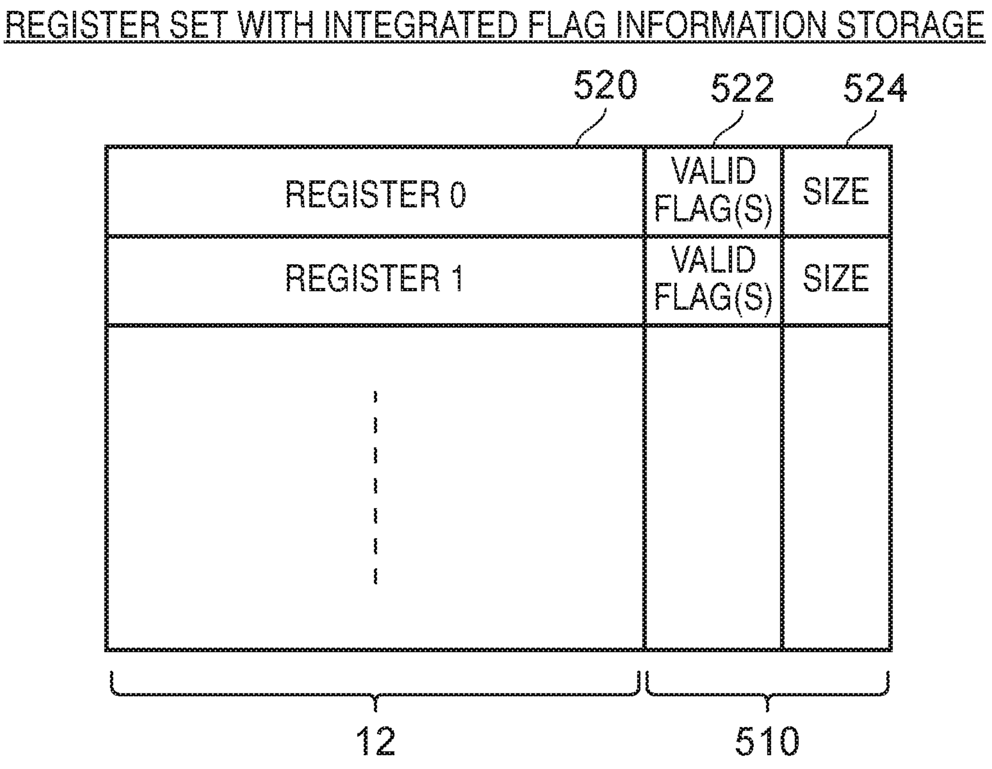
Figure 14:
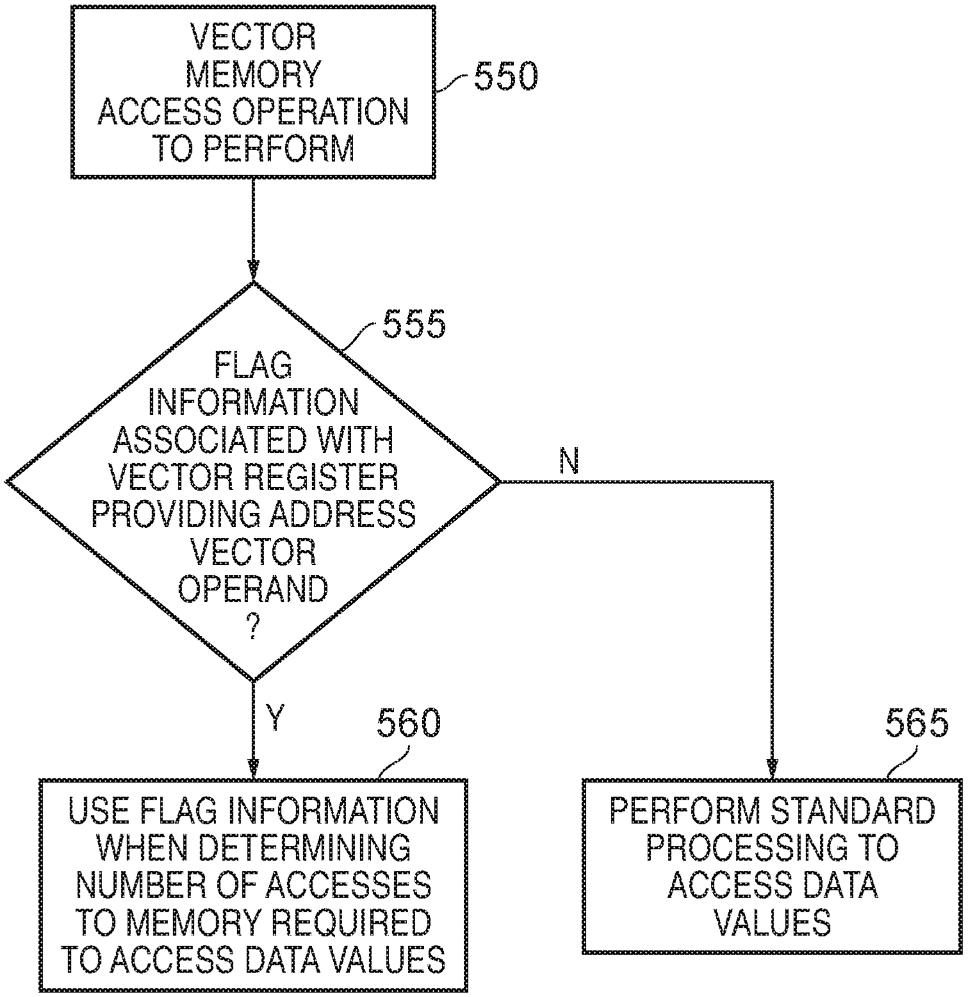
Figure 15A:
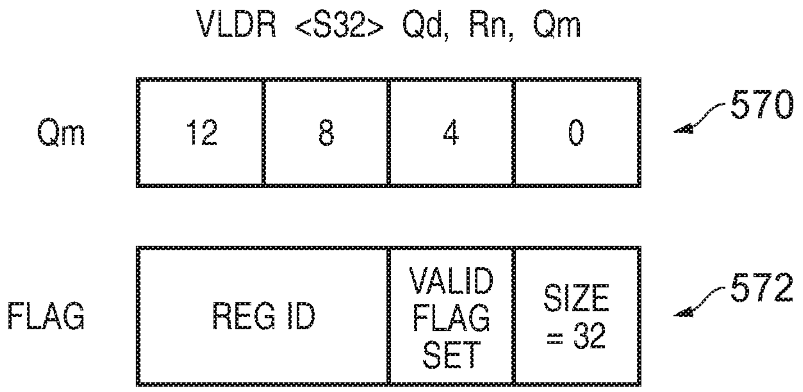
Figure 15B:
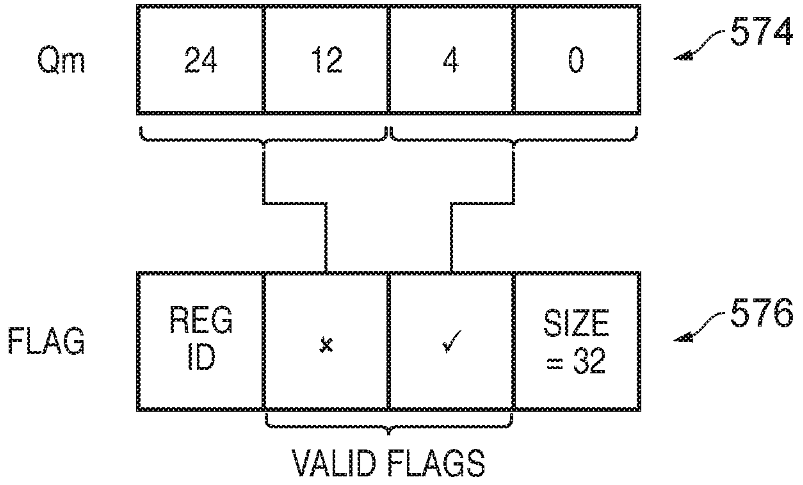
Figure 15C:
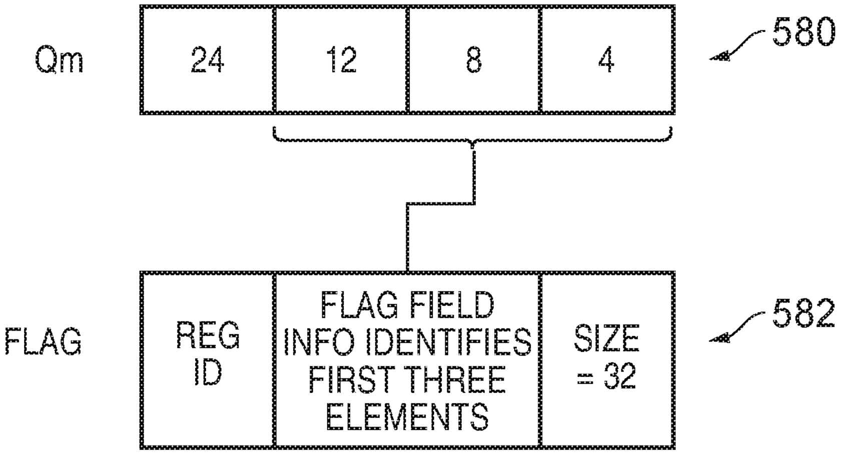
Figure 16A:
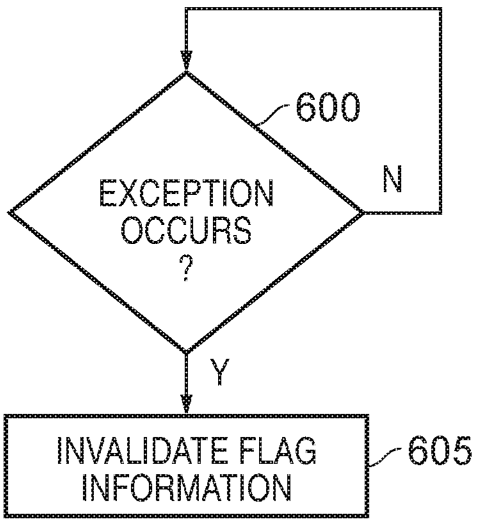
Figure 16B:
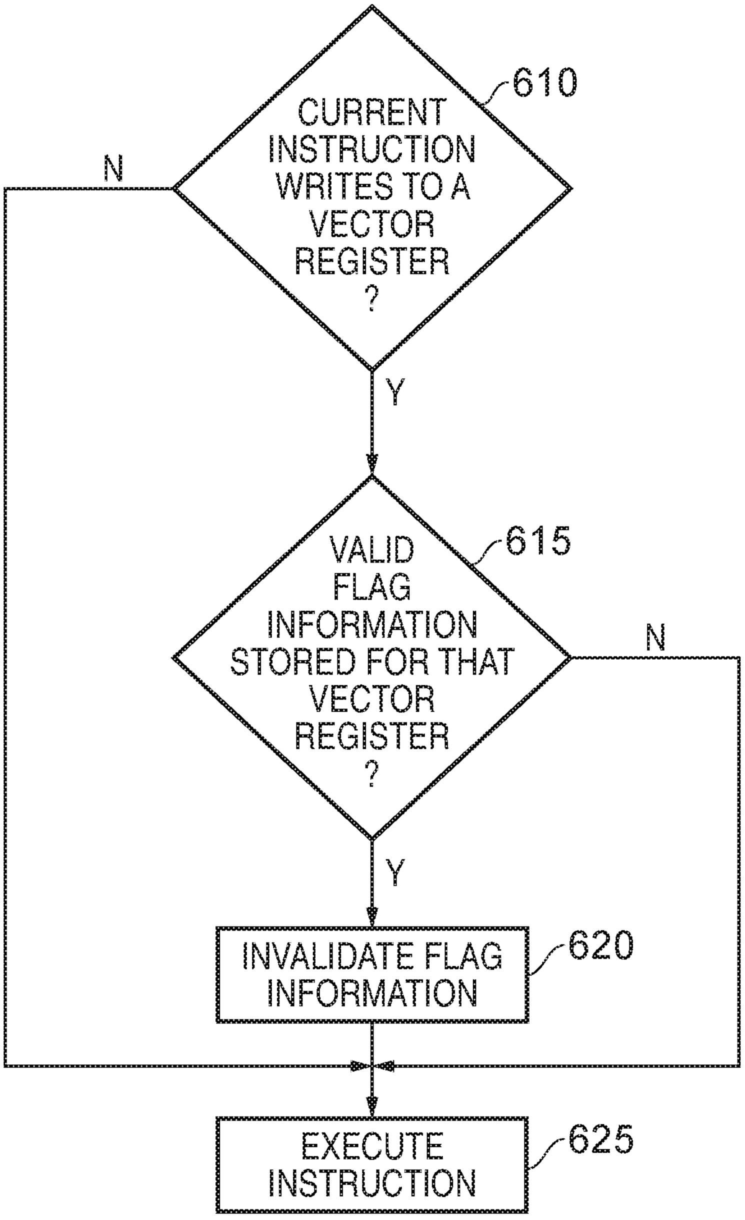
Figure 17:
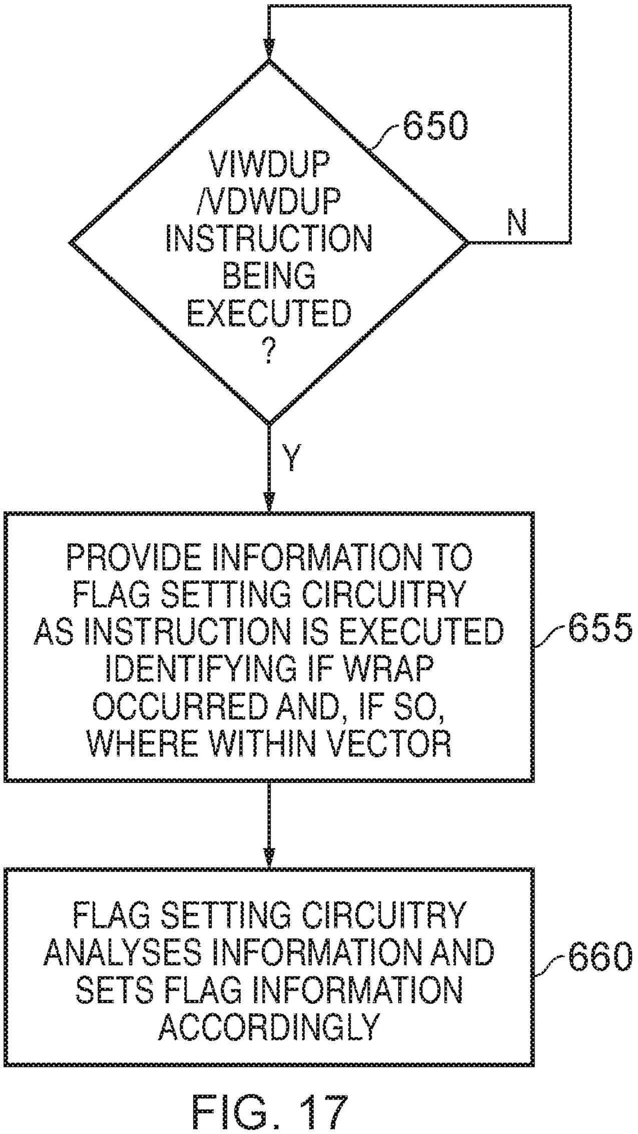
Figure 18:
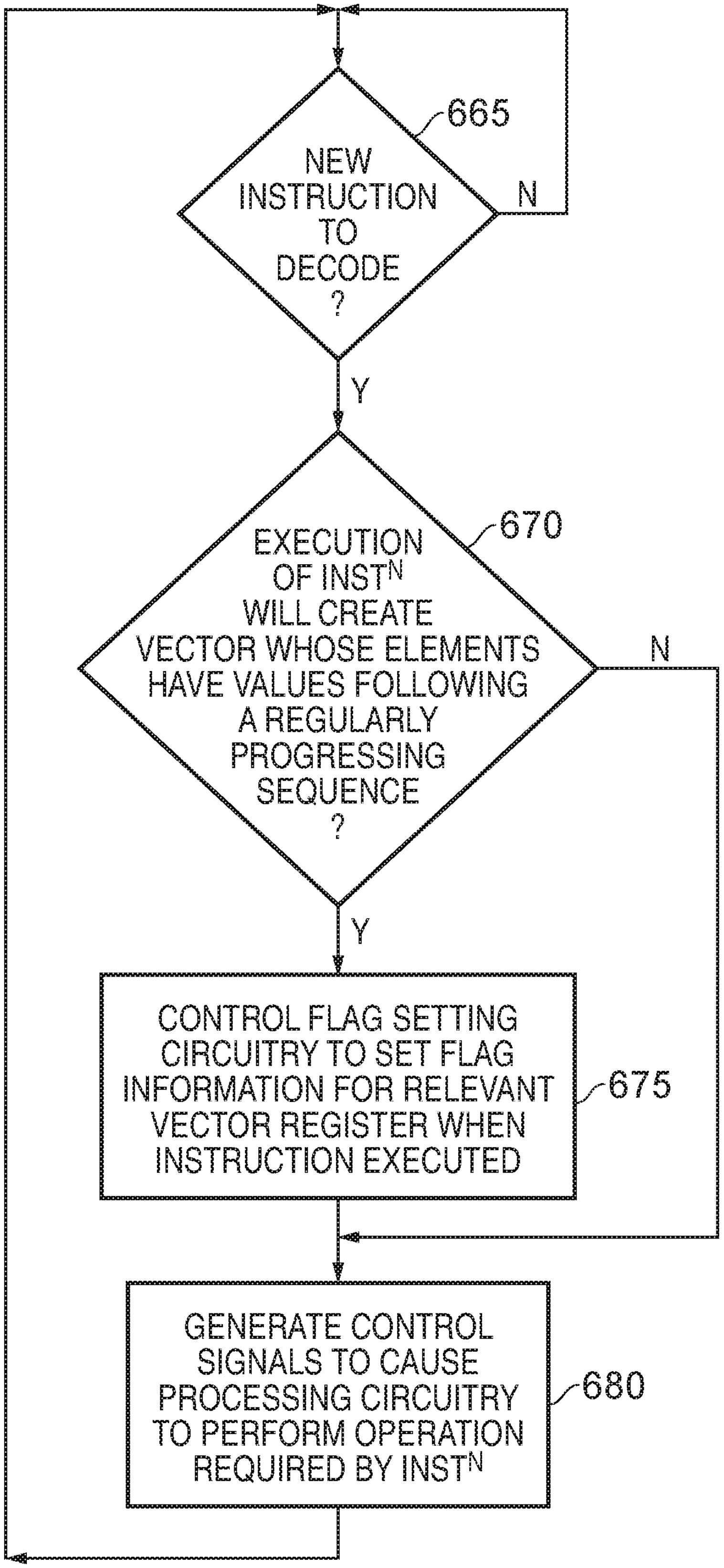
Figure 19:
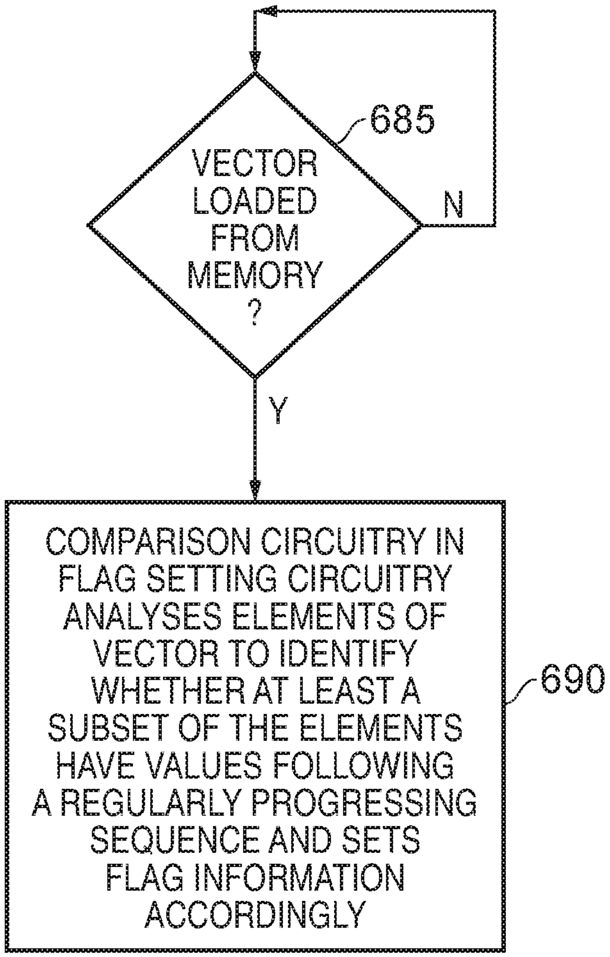
Figure 20:
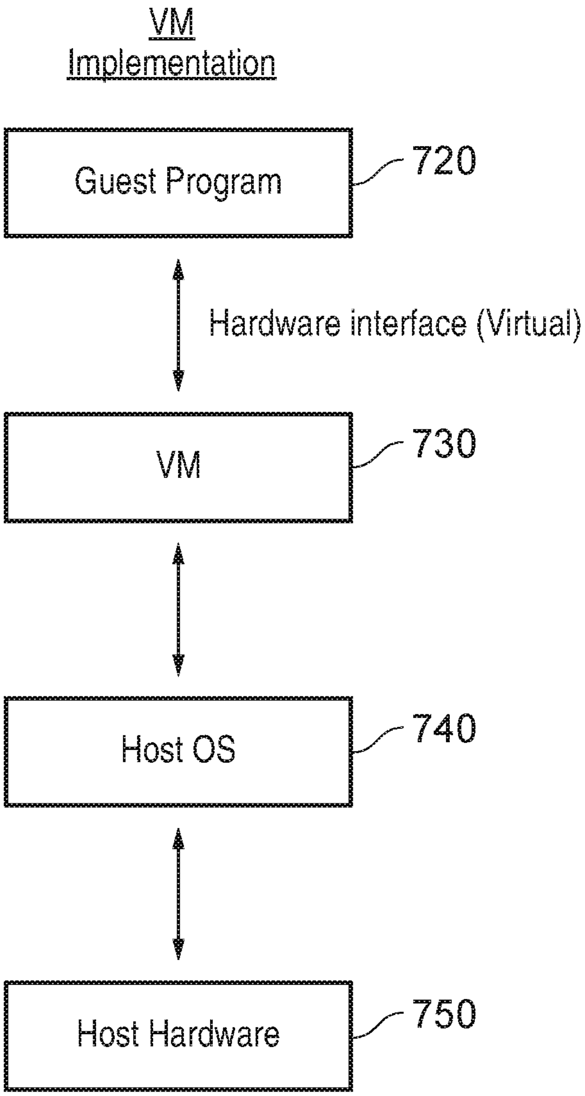

FIG. 11 schematically illustrates an arrangement of read access circuitry that may be used in association with a set of scalar registers in accordance with one embodiment;

FIG. 12 is a block diagram of an apparatus in accordance with a further embodiment;

FIGS. 13A and 13B illustrate two example arrangements of the flag information storage shown in FIG. 12 in accordance with described embodiments;

FIG. 14 is a flow diagram illustrating how the flag information may be used when executing vector memory access operations in accordance with one embodiment;

FIG. 15A to 15C illustrate different example arrangements of flag information that may be used in the described embodiments;

FIGS. 16A and 16B are flow diagrams indicating specified events that may cause the flag information to be invalidated in accordance with one embodiment;

FIGS. 17 to 19 are flow diagrams illustrating different mechanisms that may be used to populate the flag information in accordance with the described embodiments; and FIG. 20 shows a virtual machine implementation which can be used.

Before discussing the embodiments with reference to the accompanying figures, the following description of embodiments is provided.

Most Digital Signal Processors (DSP) currently available support some form of circular, sometimes also called modulo, addressing modes to memory. Such a feature is useful, as it removes the need for algorithms to perform bounds-checking and allows other optimisations.

An example use case is an FIR filter. This is a common DSP operation that creates a new result from a weighted sum of the N preceding results. With a linear memory arrangement, each time a new sample block needs to be processed, the previous results need to be accessed. This can be done by copying the N last results to the start of the linear buffer and processing from there. However, when employing a circular memory, such a copy step is no longer necessary, as the processing can simply start at the old results, and wrap back to the start of the buffer when the end is reached. Circular buffers thus enable such operations to be performed in a much more efficient manner.

One known approach for supporting circular addressing modes to memory is to provide additional logic within the address generation units (AGUs) provided in the path between the processor and memory. However, in vector processing systems where processing efficiency can be increased by loading multiple data values into respective elements of a vector operand and processing the data values several elements at a time, the access path to memory can become a significant timing constraint, and accordingly it can be difficult to sustain extra logic within that path to support circular addressing modes of operation. It would hence be desirable to provide an improved mechanism for supporting circular addressing to memory within vector processing systems.

In accordance with one embodiment, an apparatus is provided that has processing circuitry to preform vector processing operations, and an instruction decoder to decode vector instructions to control the processing circuitry to perform the vector processing operations specified by the vector instructions. The instruction decoder is responsive to a vector generating instruction identifying a scalar start value and wrapping control information to control the processing circuitry to generate a vector comprising a plurality of elements. The processing circuitry is arranged to generate the vector such that the first element is dependent on the scalar start value, and the values of the plurality of elements follow a regularly progressing sequence that is constrained to wrap as and when required to ensure that each value is within bounds determined from the wrapping control information.

The use of such a vector generating instruction provides a very efficient mechanism for generating a vector of elements that can then be used as an input operand of a subsequent memory access instruction to directly implement circular addressing within the memory, without needing to provide additional logic within the memory access path to support such circular addressing. By implementing a circular addressing mode through use of a separate instruction, this provides a great deal of flexibility in the use of circular addressing, and in the number and size of circular buffers that can be used within a system.

In accordance with the vector generating instruction of the described embodiments, a vector operand is not required as an input to the vector generating instruction, and instead the entire output vector of elements is generated from an input scalar start value, with reference to the wrapping control information that is used to determine if and when the regularly progressing sequence generated from the scalar start value is required to wrap to ensure that each value in the sequence stays within bounds determined from the wrapping control information.

There are a number of ways in which the scalar start value can be specified, but in one embodiment the vector generating instruction specifies a first scalar register providing the scalar start value. This provides a great deal of flexibility as to the specification of the scalar start value. Further, by avoiding the need to specify an input vector for the instruction, this can alleviate the constraints in the use of vector registers within the apparatus, where it is often the case that vector registers are a scarce resource which need to be used optimally.

The utilisation of the vector registers can be further optimised when using the vector generating instruction of the described embodiment, since the vector generating instruction can be coupled closely with the instruction that is intended to consume the vector of elements produced by the vector generating instruction, hence ensuring that the vector of elements generated by the vector generating instruction only needs to be retained for a relatively short period of time, until the subsequent instruction consumes that vector of elements as a source operand.

There are a number of ways in which the wrapping control information can be identified within the vector generating instruction. For example, it could be specified using one or more immediate values, but in one embodiment is specified with reference to the contents of a register. The wrapping control information could in that instance be specified within a vector register, but in one embodiment is specified by the content of a further scalar register.

The wrapping control information is used to determine the bounds within which the values need to be retained when generating the regularly progressing sequence. Whilst the wrapping control information may provide sufficient information to enable both a first and a second bound to be determined, in one embodiment the processing circuitry uses the wrapping control information to determine a first bound, whilst the second bound is predetermined. For example, in one embodiment the second bound may be a zero value. In such an embodiment, the wrapping control information may provide a size indication used to determine the first bound. The size indication can take a variety of forms. For example, it may be used to identify a size of a buffer defined by the first and second bounds, hence enabling the processing circuitry to determine points where the regularly progressing sequence will need to wrap in order to ensure that each value remains within the bounds defined by a buffer of that specified buffer size. Alternatively, the size indication can be used to identify a wrap point indicator, so as to more directly identify a value in the regularly progressing sequence that would cause that value to wrap to a logic zero value (for a regularly increasing sequence) or to identify the value that is wrapped to when the value equals zero (for a regularly decreasing sequence).

In one embodiment, the difference between each value in the regularly progressing sequence may be predetermined. However, in an alternative embodiment the vector generating instruction identifies an adjust amount used to determine a difference between values of adjacent elements in the regularly progressing sequence. By enabling the adjust amount to be specified within the vector generating instruction, this provides significantly improved flexibility with regard to the generation of vectors that are then suitable for implementing circular addressing. For example, the adjust amount can be varied to take account of the size of the data values that are to be accessed in memory, thus enabling a vector of elements to be generated that can readily be used to determine the addresses of the data values to be accessed.

In one embodiment, the vector of elements generated by the vector generating instruction may be used to directly specify the memory addresses to be accessed. However, in one embodiment the vector of elements instead specify offsets that are then combined with a base address in order to identify the actual memory addresses to be accessed. By generating a vector of offsets, this provides further enhanced flexibility, since the same vector can in principle be used to identify multiple different circular buffers in memory, merely by combining that vector of offsets with different base addresses. The only limit on the number of circular buffers is the number of available vectors used to store such vector offsets. Further, in principle the buffers can be arranged so that they overlap if desired.

By using the vector of elements to specify offsets from a base register, and by allowing the adjust amount to be varied as desired, the above described approach can be used to define in memory circular buffers that can in principle be of any size (in one embodiment the size is constrained to be a multiple of the adjust amount), and in any position in memory. This hence provides a great deal of flexibility in the use of circular buffers.

There are various constraints that can be placed on the vector generation instruction if desired. For example, by constraining the buffer size determined from the wrapping control information to be a multiple of the adjust amount, this can simplify the circuitry required to generate the vector of elements when executing the vector generating instruction. In one embodiment, the scalar start value can also be constrained to be a multiple of the adjust amount. By using such constraints, this enables a significant simplification in the circuitry used to generate the vector of elements when executing the vector generating instruction. In particular, the components required to detect the wrap points can be implemented using equality checking circuitry rather than circuitry that needs to detect greater than or less than conditions.

Further, if desired, the buffer size can be constrained so as to limit the number of potential wrapping points that may be encountered when generating the vector. For example, in one embodiment the buffer size is constrained to exceed a size value determined by multiplying the number of elements in the vector by the adjust amount. With such a constraint, it can be ensured that at most only one wrap will occur within the vector.

In one embodiment, the processing circuitry is controlled by the decoder circuitry in response to the vector generating instruction to generate said vector such that the values of the plurality of elements follow a regularly increasing sequence that is constrained to wrap as required to ensure that each value is within the bounds determined from the wrapping control information. However, alternatively, the processing circuitry may be controlled by the decoder circuitry in response to the vector generating instruction to generate said vector such that the values of the plurality of elements follow a regularly decreasing sequence that is constrained to wrap as required to ensure that each value is within the bounds determined from the wrapping control information.

By providing circuitry that can check when either the upper bound or the lower bound is encountered as defined by the wrapping control information, it is possible to create vectors whose elements follow a positively incrementing sequence or a negatively incrementing sequence, so that those vectors can be used to identify circular buffers that are "walked" in either direction. In one embodiment, two different variants of the vector generating instruction can be defined, one that results in the generation of a regularly increasing sequence constrained to wrap as required, whilst the other is used to generate a regularly decreasing sequence that is constrained to wrap as required.

The vector generating instruction of the described embodiments can be useful in a variety of situations. However, as discussed earlier, a particular use case can be to implement a circular addressing mode within memory, where the vector generating instruction can be coupled with an associated vector memory access instruction. In particular, in one embodiment the decoder circuitry may be responsive to a vector memory access instruction to control the processing circuitry to access in memory a plurality of data values at addresses determined by an input address vector operand comprising a plurality of address elements. In such an arrangement, the apparatus can be arranged to execute a sequence of instructions comprising both the earlier-mentioned vector generating instruction and an associated vector memory access instruction, with the associated vector memory access instruction identifying as the input address vector operand the vector generated by the vector generating instruction. By such an approach, this ensures that the plurality of data values are accessed within a circular buffer within the memory.

In one particular embodiment, the associated vector memory access instruction identifies a base address providing a start address of the circular buffer, and the input address vector operand specifies as the plurality of address elements a vector of address offsets to be combined with the base address in order to identify each address to be accessed. As discussed earlier, such an approach provides significant flexibility as to the location of the circular buffers within memory, since the location of the circular buffer is determined by the base address, with the vector of elements generated by the vector generating instruction then being used to identify the sequence in which the data values are accessed within the circular buffer identified with reference to that base address.

In one embodiment, the execution of a vector instruction may be divided into parts referred to as "beats", with each beat corresponding to processing of a portion of a vector of a predetermined size. A beat is an atomic part of a vector instruction that is either executed fully or not executed at all, and cannot be partially executed. The size of the portion of a vector processed in one beat may be defined by the architecture and can be an arbitrary fraction of the vector.

In one such embodiment, in response to a given vector instruction, the processing circuitry is configured to perform a plurality of beats of processing each corresponding to a section of a vector value, and the processing circuitry is configured to support overlapped execution of said vector generating instruction and said associated vector memory access instruction, in which a first subset of beats of the associated vector memory access instruction is performed in parallel with a second subset of beats of the vector generating instruction. By enabling the overlapped execution of the vector generating instruction and the associated vector memory access instruction, this can provide significant performance improvements.

Whilst the vector generating instruction allows wrapping behaviour to be supported when generating the vector of elements, in one embodiment the wrapping behaviour can be selectively disabled. In particular, in one embodiment the instruction decoder is responsive to a specified condition being detected when decoding the vector generating instruction, to disable use of the wrapping control information by the processing circuitry, such that the processing circuitry is arranged to generate the vector such that the first element in said plurality is dependent on the scalar start value, and the values of the plurality of elements follow the regularly progressing sequence without any wrapping constraint. Hence, upon encountering the specified condition, the vector generating instruction can be used to generate a vector whose elements follow the regularly progressing sequence, whether that be a regularly increasing sequence or a regularly decreasing sequence. This provides additional flexibility in the use of the vector generating instruction.

The specified condition can take a variety of forms, but in one embodiment the specified condition is detected when a reserved value is used to identify the wrapping control information within the vector generating instruction. This hence effectively identifies that the wrapping control information is invalid. The reserved value could take a variety of forms. For example, in one embodiment the reserved value could be an unallowed immediate value, whilst in an alternative embodiment the reserved value could take the form of a predetermined register being identified for the wrapping control information, that predetermined register being a register that cannot validly be used to provide wrapping control information.

In one embodiment, both the scalar start value and the wrapping control information are identified within the vector generating instruction with reference to scalar registers within a set of scalar registers provided by the apparatus. In one particular embodiment, the choice of the scalar registers used to identify the scalar start value and the wrapping control information is constrained with the aim of reducing access time to the required information when the instruction is executed. For example, in one embodiment the specification of the first and second scalar registers used to identify the scalar start value and the wrapping control information, respectively, is constrained such that the first scalar register is chosen from a first group of scalar registers in the set of scalar registers that is non-overlapping with a second group of registers in said set from which the second scalar register is chosen. By constraining the choice of the first and second scalar registers in this way, the access circuitry used to access the set of scalar registers can be arranged so as to enable the contents of both the first and second scalar registers to be accessed at the same time with fewer read ports, or for the register file to be split into two independent banks, thereby producing the access to both registers at lower cost in terms of hardware, and potentially area.

In one embodiment the processing circuitry can be controlled to generate the vector required by the vector generating instruction by iteratively executing a sequence of steps to generate each of the plurality of elements. However, in an alternative embodiment the process can be parallelised in order to enable multiple of the elements to be generated in parallel, thereby improving performance. In particular, in one embodiment the processing circuitry comprises adder circuitry to generate a plurality of candidate elements for said vector using an input value derived from the scalar start value and a sequence of regularly progressing adjust values, and modification circuitry to generate from each candidate element an output element for inclusion within said vector. For each candidate element, the modification circuitry is arranged to determine whether a wrap condition is present, and in the presence of said wrap condition to perform an arithmetic operation to modify the candidate element based on the wrapping control information in order to generate the output element, and otherwise to use the candidate element unmodified as the output element.

By such an approach, multiple of the computations can be performed in parallel. Indeed, if desired, the adder circuitry and the modification circuitry can be arranged so as to enable all of the elements of the vector to be generated in parallel. Alternatively, a smaller sized adder circuitry and modification circuitry may be used, allowing multiple of the elements to be determined in parallel, and with additional iterations through the adder circuitry and the modification circuitry being performed to calculate any remaining elements required by the vector.

In one particular embodiment, the processing circuitry is controlled by the decoder circuitry in response to the vector generating instruction to generate the vector such that the values of the plurality of elements follow a regularly decreasing sequence that is constrained to wrap as required to ensure that each value is within the bounds determined from the wrapping control information, and the adder circuitry comprises a separate adder block to generate each candidate element by subtracting an associated one of the adjust values from the input value. A carry out signal from each adder block is used to determine whether the wrap condition is present for the associated candidate element. Hence, in such embodiments, the modification circuitry can be significantly simplified, since the determination as to whether a wrap condition is present can be directly deduced from the carry out signal from each adder block. This avoids the requirement for more complicated comparison circuitry to be included within the modification circuitry to detect when the wrap condition is present.

In one embodiment, a similar principle can be adopted when execution of the vector generating instruction causes generation of a vector in which the plurality of elements following a regularly increasing sequence, again constrained to wrap as required. In particular, in one embodiment the input value is derived from the scalar start value by subtracting from the scalar start value an upper bound value derived from the wrapping control information. The adder circuitry comprises a separate adder block to generate each candidate element by adding an associated one of the adjust values to the input value, and a carry out signal from each adder block is used to determine whether the wrap condition is present for the associated candidate element.

Hence, in this embodiment the input value is modified by performing an initial subtraction of the upper bound value from the scalar start value. By performing that initial subtraction, when the adder circuitry is then used to add an associated one of the adjust values to the input value, the carry out signal from each adder block can again be used to determine whether the wrap condition is present. In the presence of the wrap condition, the modification circuitry will then modify the candidate element. Hence, by appropriate adjustment of the input value, the simplification to the modification circuitry enabled by using the carry out signal can be retained even when generating a regularly increasing sequence.

In one embodiment, the modification circuitry is arranged, in the presence of the wrap condition, to perform as said arithmetic operation an addition of an upper bound value derived from the wrapping control information to the candidate element in order to generate the output element.

Hence, in both instances where the processing circuitry is generating a regularly increasing sequence or a regularly decreasing sequence, the modification circuitry can be arranged in the same way, so as to add an upper bound value derived from the wrapping control information to the associated candidate element, when the carry out signal is set.

Particular embodiments will now be described with reference to the Figures.

Figure 1:
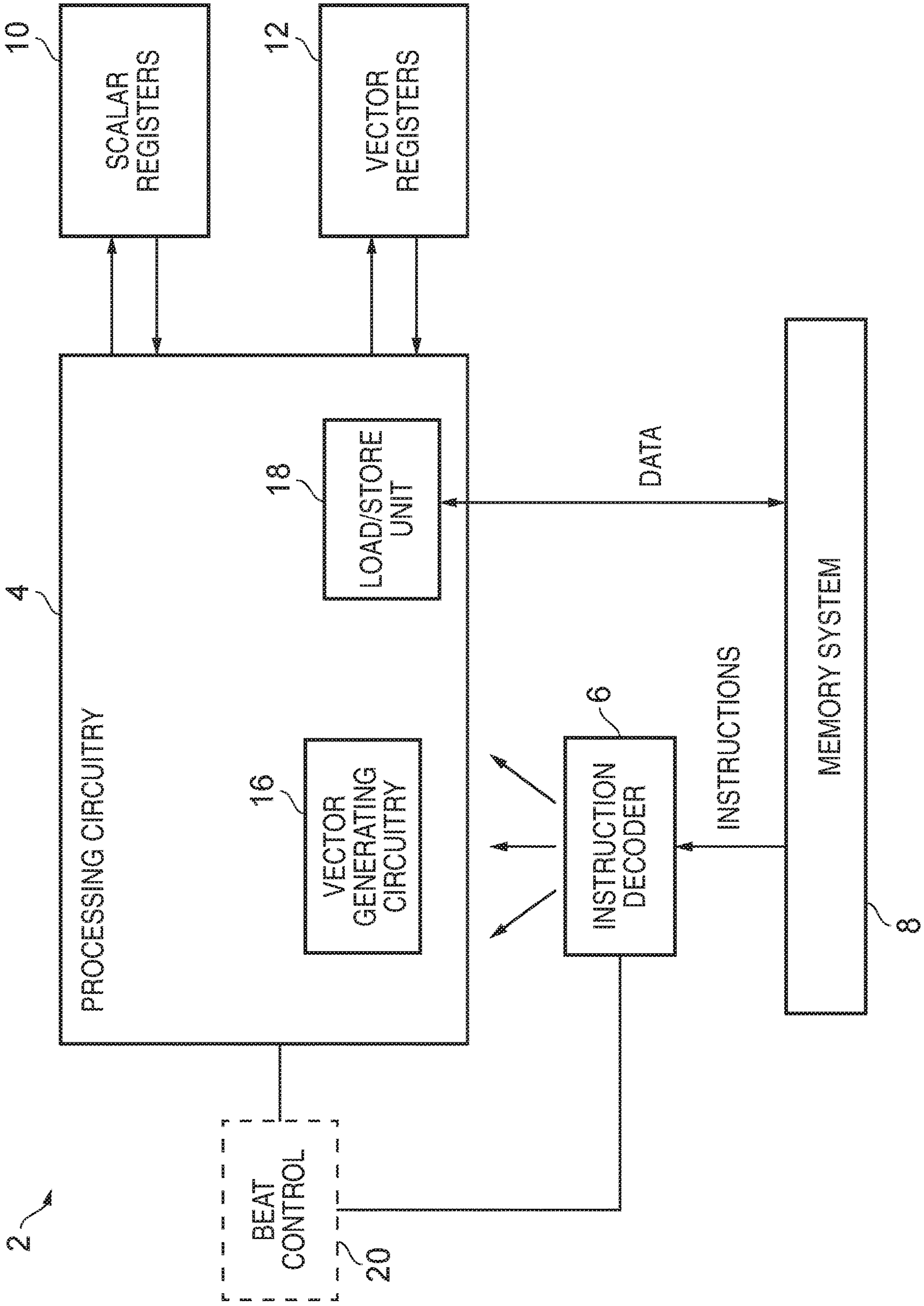

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example, the decoder 6 may interpret the opcodes of the decoded instructions and any additional control fields of the instructions to generate control signals which cause the processing circuitry 4 to activate appropriate hardware units to perform operations such as arithmetic operations, load/store operations or logical operations. The apparatus has a set of scalar registers 10 and a set of vector registers 12. It may also have other registers (not shown) for storing control information used to configure the operation of the processing circuitry. In response to arithmetic or logical instructions, the processing circuitry typically reads source operands from the registers 10, 12 and writes results of the instructions back to the registers 10, 12. In response to load/store instructions, data values are transferred between the registers 10, 12 and the memory system 8 via a load/store unit 18 within the processing circuitry 4. The memory system 8 may include one or more levels of cache as well as main memory.

The set of scalar registers 10 comprises a number of scalar registers for storing scalar values which comprise a single data element. Some instructions supported by the instruction decoder 6 and processing circuitry 4 may be scalar instructions which process scalar operands read from the scalar registers 10 to generate a scalar result written back to a scalar register.

The set of vector registers 12 includes a number of vector registers, each arranged to store a vector value comprising multiple elements. In response to a vector instruction, the instruction decoder 6 may control the processing circuitry 4 to perform a number of lanes of vector processing on respective elements of a vector operand read from one of the vector registers 12, to generate either a scalar result to be written to a scalar register 10 or a further vector result to be written to a vector register 12. Some vector instructions may generate a vector result from one or more scalar operands, or may perform an additional scalar operation on a scalar operand in the scalar register file as well as lanes of vector processing on vector operands read from the vector register file 12. Hence, some instructions may be mixed scalar-vector instructions for which at least one of the one or more source registers and a destination register of the instruction is a vector register 12 and another of the one or more source registers and the destination register is a scalar register 10.

Vector instructions may also include vector load/store instructions which cause data values to be transferred between the vector registers 12 and locations in the memory system 8. The load/store instructions may include contiguous load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or to store data from respective elements of a vector register to the discrete addresses.

The processing circuitry 4 may support processing of vectors with a range of different data element sizes. For example, a 128-bit vector register 12 could be partitioned into sixteen 8-bit data elements, eight 16-bit data elements, four 32-bit data elements or two 64-bit data elements. A control register may be used to specify the current data element size being used, or alternatively this may be a parameter of a given vector instruction to be executed.

The processing circuitry 4 may include a number of distinct hardware blocks for processing different classes of instructions. For example, load/store instructions which interact with the memory system 8 may be processed by a dedicated load/store unit 18, whilst arithmetic or logical instructions could be processed by an arithmetic logic unit (ALU). The ALU itself may be further partitioned into a multiply-accumulate unit (MAC) for performing operations involving multiplication, and a further unit for processing other kinds of ALU operations. A floating-point unit can also be provided for handling floating-point instructions. Pure scalar instructions which do not involve any vector processing could also be handled by a separate hardware block compared to vector instructions, or re-use the same hardware blocks.

As will be discussed in more detail with reference to the remaining figures, in accordance with one embodiment vector generating circuitry 16 is provided within the processing circuitry 4 that is arranged to perform operations required by a vector generating instruction that may be included within the sequence of instructions executed by the apparatus 2. The vector generating circuitry 16 could comprise a dedicated block within the processing circuitry 4, or may be incorporated within one of the other circuit blocks such as the ALU.

In accordance with some of the embodiments described herein, a new type of vector generating instruction may be defined that identifies a scalar start value and wrapping control information. When such an instruction is decoded by the instruction decoder 6, control signals are sent to the processing circuitry 4 to cause the vector generating circuitry 16 to generate a vector comprising a plurality of elements, with that generated vector then typically being stored within one of the vector registers 12. The vector generating circuitry 16 is arranged to generate the vector such that the first element in the vector is dependent on the scalar start value, and the values of the plurality of elements then follow a regularly progressing sequence that is constrained to wrap as required to ensure that each value is within bounds determined from the wrapping control information. The regularly progressing sequence can be a regularly increasing sequence or a regularly decreasing sequence, and in one embodiment different variants of the vector generating instruction are specified for both increasing and decreasing sequences.

Such a generated vector of elements can be useful in a variety of situations. However, one particular use case where such a vector is very useful is as an input operand for the earlier-mentioned vector gather/scatter load/store instructions. In particular, in one embodiment, the vector generated by the vector generating instruction can be used as a vector of offsets provided as an input operand for such a vector load/store instruction that causes gather/scatter operations to be performed. Such instructions typically also receive a scalar input specifying a base address, and the vector of offsets is then used to generate each of the addresses to be accessed in memory with reference to that base address. Whilst such vector load or store instructions can be used to access an arbitrary set of addresses within the memory, when using a vector of offsets generated by the above-mentioned vector generating instruction, this enables a sequence of addresses to be identified that reside within a circular buffer within memory. Hence, this mechanism provides a very efficient technique for employing circular addressing modes in memory, without needing to add additional circuitry into the memory access path, and hence avoiding the potential performance impact that such additional circuitry would introduce within that path. This provides significant benefits in vector processing systems, where the memory access path is often a critical timing path within the system.

As also shown in FIG. 1, beat control circuitry 20 can be provided if desired to control the operation of the instruction decoder 6 and the processing circuitry 4. In particular, in some embodiments the execution of the vector instruction may be divided into parts referred to as "beats", with each beat corresponding to processing of a portion of a vector of a predetermined size. As will be discussed in more detail later with reference to FIGS. 8 and 9, this can allow for overlapped execution of the vector instructions, thereby improving performance.

Figure 2:
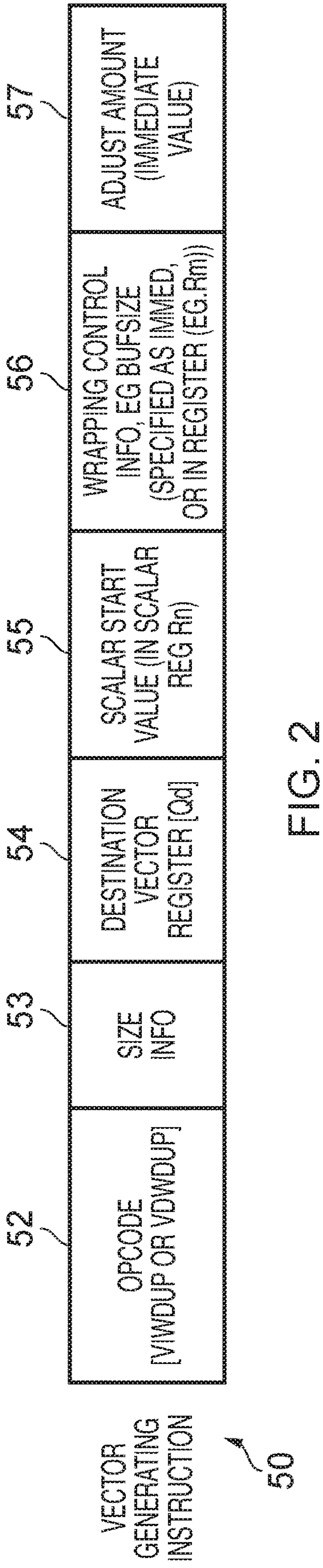

FIG. 2 is a diagram schematically illustrating fields that may be provided within a vector generating instruction of the type discussed above. In particular, the instruction 50 may include a first field 52 specifying the opcode of the instruction. This can be used to identify that the instruction is the vector generating instruction, and can also be used to identify different variants of the instruction, such as incrementing or decrementing variants. In one particular embodiment, the incrementing variant of the vector generating instruction is referred to as a vector increment and wrap duplicate (VIWDUP) instruction, whilst the decrementing version is referred to as a vector decrement and wrap duplicate (VDWDUP) instruction. The "duplicate" reference is merely intended to identify that the value determined for each of the elements of the vector is derived from a scalar seed value, the actual value for each element being in this case an incremented or decremented version of the preceding element value, with the initial element value derived from the scalar seed value.

In one embodiment a size information field 53 is provided within the instruction to identify the size of the data values within a vector. In particular, where the processing circuitry allows data values of different sizes to be processed within a vector, then such a field can be used to identify the particular data value size to which the current instruction relates. In alternative embodiments, such size information may not be required, as the data value size may be predetermined.

The destination vector register field 54 identifies a vector register (for example referred to in FIG. 2 as the register Qd) into which the vector of elements generated by executing the instruction is to be written. The field 55 provides a scalar start value, which in one embodiment is identified with reference to one of the scalar registers (in the example of FIG. 2 this being referred to as the scalar register Rn).

A wrapping control information field 56 is also provided to identify wrapping information that is used to identify bounds, i.e. the points at which a regularly increasing sequence or a regularly decreasing sequence of values will need to wrap. In one particular embodiment, the wrapping control information is used to determine a first bound, and the second bound is predetermined. More particularly, in one embodiment the second bound is assumed to be a zero value. In such embodiments, the wrapping control information can for example provide size information, referred to herein as a buffer size or "BUFSIZE", and given that the second bound is predetermined, this enables the value of the first bound to be identified. The wrapping control information can be specified as an immediate value within the instruction, or could instead be identified with reference to a register, either one of the scalar registers 10 or one of the vector registers 12. In one embodiment, the wrapping control information is specified by a further scalar register, and in the example of FIG. 2 this is referred to as the scalar register Rm.

In one embodiment the data values subjected to vector processing may be of a predetermined size, but in alternative embodiments the data value size may be varied, such that when executing some instructions the data values are assumed to be of a first size, whilst when executing other instructions they are assumed to be of a different size. In embodiments that support different data value sizes, then the vector generating instruction 50 may include an adjust amount field 57 which can be specified in one embodiment as an immediate value, but which could alternatively be specified by the contents of a register. When the instruction is executed, the adjust amount will determine the amount by which each element is increased or decreased within the regularly progressing sequence. As mentioned earlier, in one embodiment the vector generated by the vector generating instruction will be used as a vector of address offsets for a subsequent vector load or store instruction, and hence the adjust amount can be set having regard to the size of the data values that will be accessed by that subsequent vector load or store instruction. For example, in one embodiment the adjust amount will be set to one if the data values that are subsequently to be accessed are byte size data values, will be set to two if the data values are 16-bits entities, and will be set to four if the data values are 32-bit entities.

Figure 3:
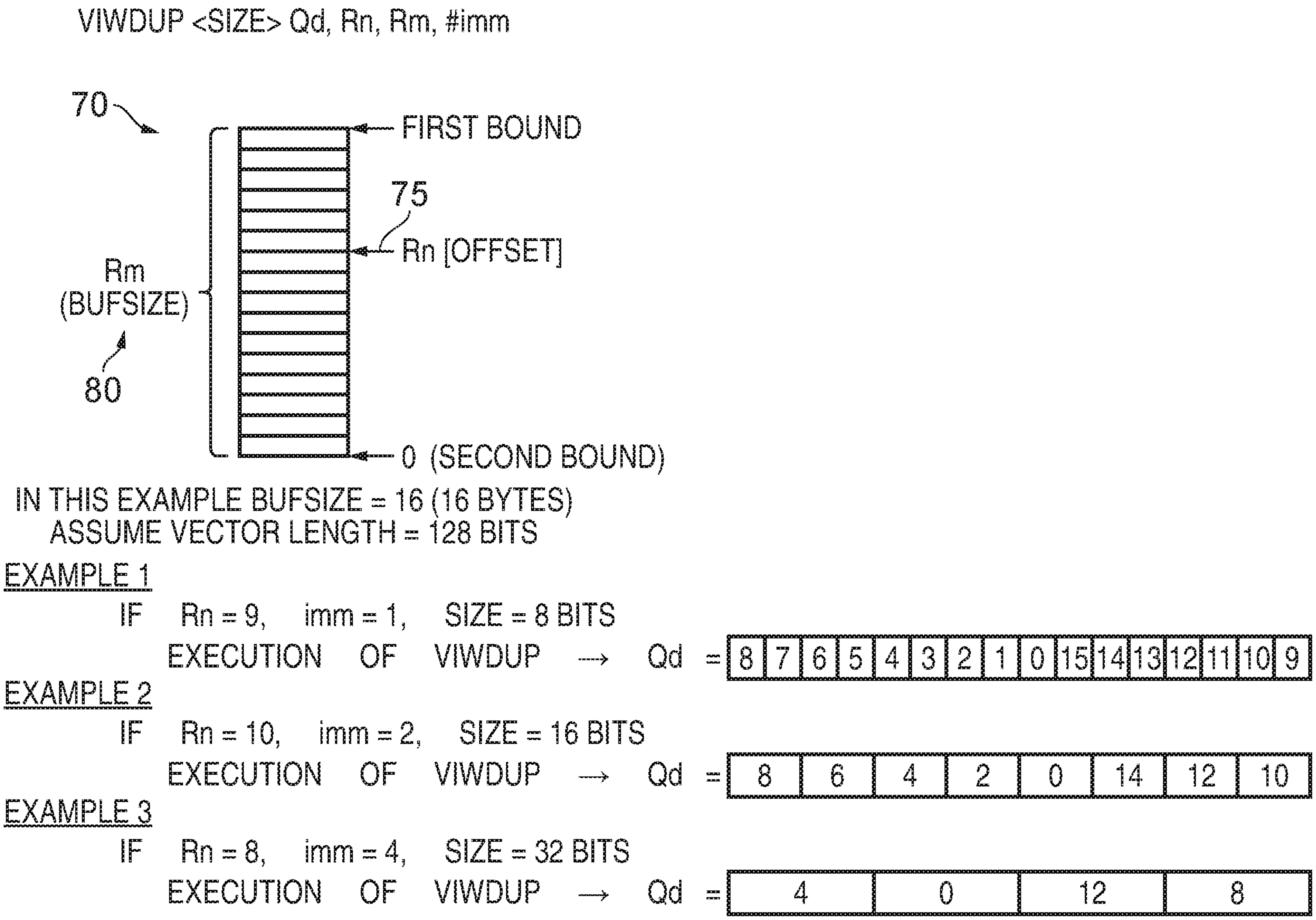

The manner in which the vector of elements is generated when executing the vector generating instruction is illustrated in more detail with reference to the particular example of FIG. 3. In this example, it is assumed that the vector generating instruction is the VIWDUP instruction, i.e. the incrementing variant. As shown in FIG. 3, a logical buffer 70 is identified having a second bound which is assumed to have a zero value, and a first bound that is identified with reference to the buffer size 80. The scalar start value 75 identifies a particular point within that logical buffer that is used as a starting value. In the example illustrated in FIG. 3, the buffer size is assumed to be 16, i.e. 16 bytes, and it is assumed that the vector length is 128 bits. The buffer size has been chosen to be relatively small purely for illustration, since this helps to illustrate the wrapping behaviour of the operation for each of the three examples shown in FIG. 3. In practice, the buffer size may be significantly larger, so that occurrences of wrapping taking place when generating any particular instance of the vector will be reduced.

As illustrated in example one, it is assumed that the adjust amount is set to one, i.e. indicating that the associated data value size is 8 bits, and the scalar start value is set to nine, this resulting in the generation of the vector shown in example one containing sixteen entries, one for each of the 8-bit sized data values. As can be seen, the elements within the vector follow a regularly increasing sequence, but wrap at the point where the value would have been incremented to the first bound value, at that point the sequence returning to zero and then increasing thereafter.

Example two shows a situation where the adjust amount is set to two, i.e. identifying that the associated data values are 16 bits in size. It is assumed in this instance that the scalar start value is ten, and this results in the generation of the vector shown in FIG. 3 having eight elements, one for each of the 16-bit sized data values within a 128-bit vector. Again, the wrap point is seen to occur where the value would have been incremented to the first bound value, but instead is then wrapped back to a logic zero value.

Example three shows an example where the adjust amount is set to four, indicating that the data value size is 32 bits. In this example, the initial scalar start value is eight, and this results in the generation of the vector of elements shown in FIG. 3, where there are four elements within the vector, one for each of the 32-bit data values within a 128-bit vector. Again, it can be seen that a wrapping occurs at the appropriate point.

The use of a specific instruction to generate vectors of this type provides a great deal of flexibility with regard to the specification of circular buffers in memory. In principle, such circular buffers can be of any size, and at any location within the memory, and indeed if desired multiple buffers can be defined that overlap within the memory address space.

In one embodiment, a number of constraints can be placed on the specification of the buffer size and the scalar start value, in order to simplify the circuitry required to implement the vector generating operation. For example, in one embodiment the buffer size may be constrained to be a multiple of the adjust amount. In addition, if desired, the scalar start value can be constrained to be a multiple of the adjust amount. These two constraints can be seen to be in place for the three examples illustrated in FIG. 3. By using such constraints, the circuitry required to detect the wrap points can be implemented in at least some embodiments using equality checking circuitry rather than circuitry that needs to detect greater than or less than conditions.

The functionality implemented when executing either the VIWDUP or the VDWDUP instructions can be illustrated as follows:

```
VIWDUP.<size> Qd, Rn, Rm, #imm   with imm restricted to {1,2,4,8}
offset = Rn;                // Rn specifies current offset
bufsize = Rm;               // Rm specifies size of buffer in bytes
for e = 0 ... N
    Qd[e] = offset;
    offset = offset + imm;
    if offset == bufsize     → offset = 0;
Rn = offset;
VDWDUP.<size> Qd, Rn, Rm, #imm   with imm restricted to {1,2,4,8}
offset   = Rn;              // Rn specifies current offset
bufsize = Rm;               // Rm specifies size of buffer in bytes
for e = 0 ... N
    Qd[e] = offset;
    if   offset == 0         → offset = bufsize − imm;
    else                     → offset = offset − imm;
Rn = offset;
```

The above functionality is discussed in more detail with reference to the flow diagram of FIG. 4. At step 100, a vector generating instruction with wrap function is executed, whereafter at step 105 the scalar register Rn is read to obtain the initial offset, i.e. the scalar start value. In addition, at step 110, the scalar register Rm is read to obtain the buffer size information. Thereafter, at step 115, a variable "e" is set equal to zero, and then at step 120 the e-th element within the result vector register is set equal to the current offset value. The subsequent steps performed are then dependent on whether the vector generating instruction executed is the incrementing version or the decrementing version.

If it is determined at step 125 that it is the incrementing version, then at step 130 the offset is incremented by the immediate value, i.e. the adjust amount, whereafter at step 135 it is determined whether the offset is now equal to the buffer size. If it is, then the offset is reset to zero at step 140 prior to proceeding to step 145, whereas if it is not the process proceeds directly to step 145. At step 145, it is determined whether the value of e has reached a maximum value, this being dependent on the number of data values within the vector of a predetermined length (as determined from the data value size). If e is not yet at the maximum value, then e is incremented at step 150, prior to the process returning to step 120.

If at step 125 it is determined that the instruction being executed is the decrementing version, then at step 155 it is determined whether the offset currently equals zero. If it does, then the offset is adjusted at step 160 to a value equal to subtracting the immediate value from the buffer size. However, if it is not determined to be equal to zero at step 155, then the offset is decremented by the immediate value at step 165. Following steps 160 or 165, the process then proceeds to step 145.

Once it is determined at step 145 that e has reached its maximum value, then all of the elements of the vector will have been generated, and accordingly the result vector Qd will contain the desired plurality of elements. The process then proceeds to step 170 where, in one embodiment, the offset value within the register Rn is updated. Step 170 is optional, but can be useful if the vector generating instruction is to be executed iteratively, for example within the body of a loop, as on the next iteration the register Rn will then already contain the appropriate start value for that next iteration.

Figure 4:
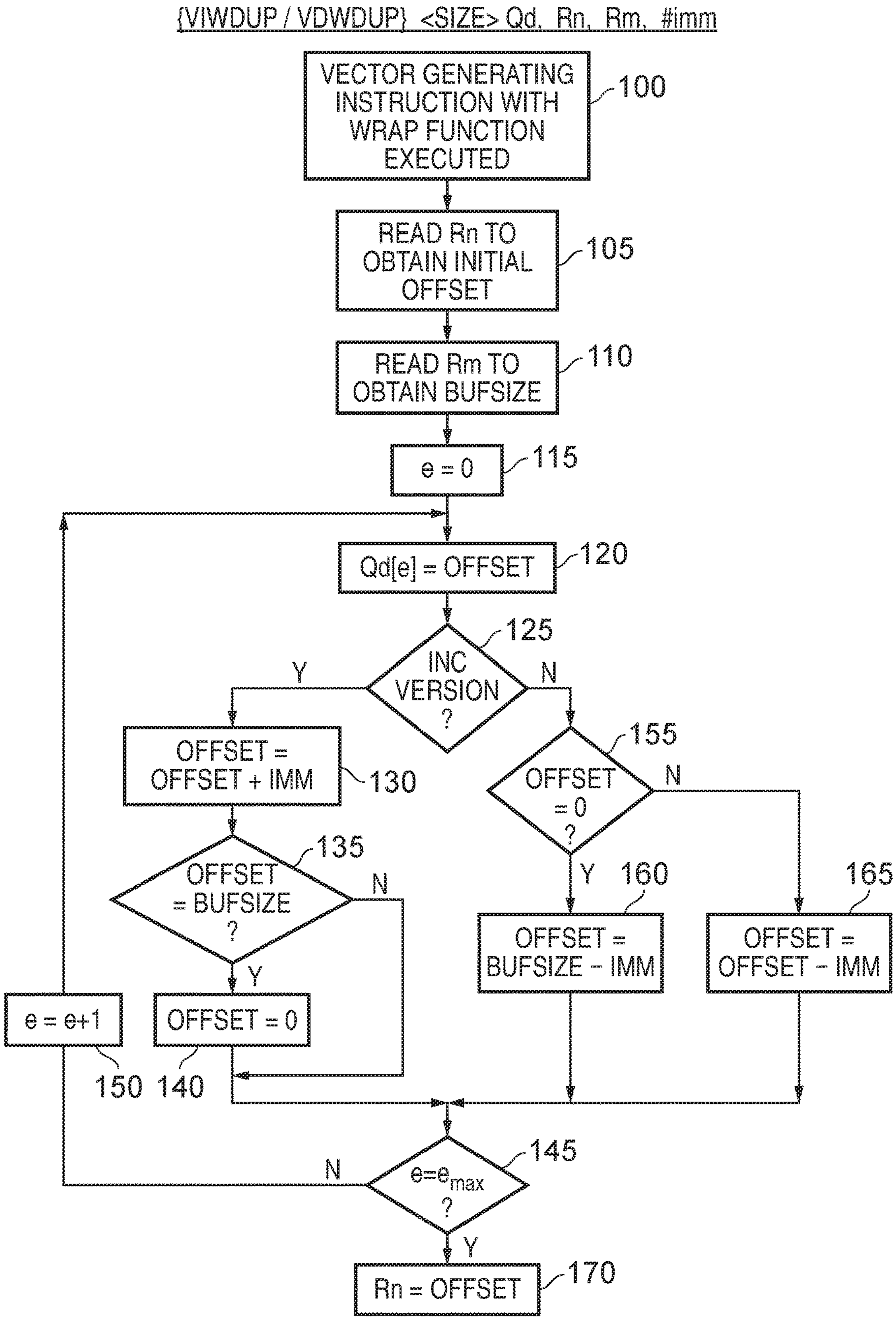

As an alternative to the approach shown in FIG. 4, in some embodiments the scalar register Rn may be updated during each iteration. Hence, in this embodiment, box 170 can be considered to reside within the "no" path from step 145. Following a final iteration where it is determined that e is equal to its maximum value, the process will then follow the "yes" path, and will again update the contents of the register Rn as per the procedure shown in FIG. 4.

Whilst in one embodiment the source register Rm specifies the buffer size, in an alternative embodiment it could directly specify the wrapping point value, by providing a value equal to subtraction of the immediate value from the size of the buffer. In such an arrangement, the earlier-described functionality for the VIWDUP instruction becomes the following:

```
VIWDUP.<size> Qd, Rn, Rm, #imm      with imm restricted to {1,2,4,8}
offset  = Rn;               // Rn specifies current offset
wrap    = Rm;               // Rm specifies size of buffer in bytes − imm
for e = 0 ... N
       Qd[e] = offset;
       if offset == wrap    →offset = 0;
       else offset = offset + imm;
Rn = offset;
```

This approach can potentially reduce the hardware requirements, and would enable the determination as to whether to wrap to be performed in parallel with the incrementing of the offset.

The corresponding functionality for the VDWDUP instruction is as follows:

```
VDWDUP.<size> Qd, Rn, Rm, #imm    with imm restricted to {1,2,4,8}
offset  = Rn;              // Rn specifies current offset
wrap    = Rm;              // Rm specifies size of buffer in bytes − imm
for e = 0 ... N
      Qd[e] = offset;
      if   offset == 0     → offset = wrap;
      else                 → offset = offset − imm;
Rn = offset;
```

Figure 5:
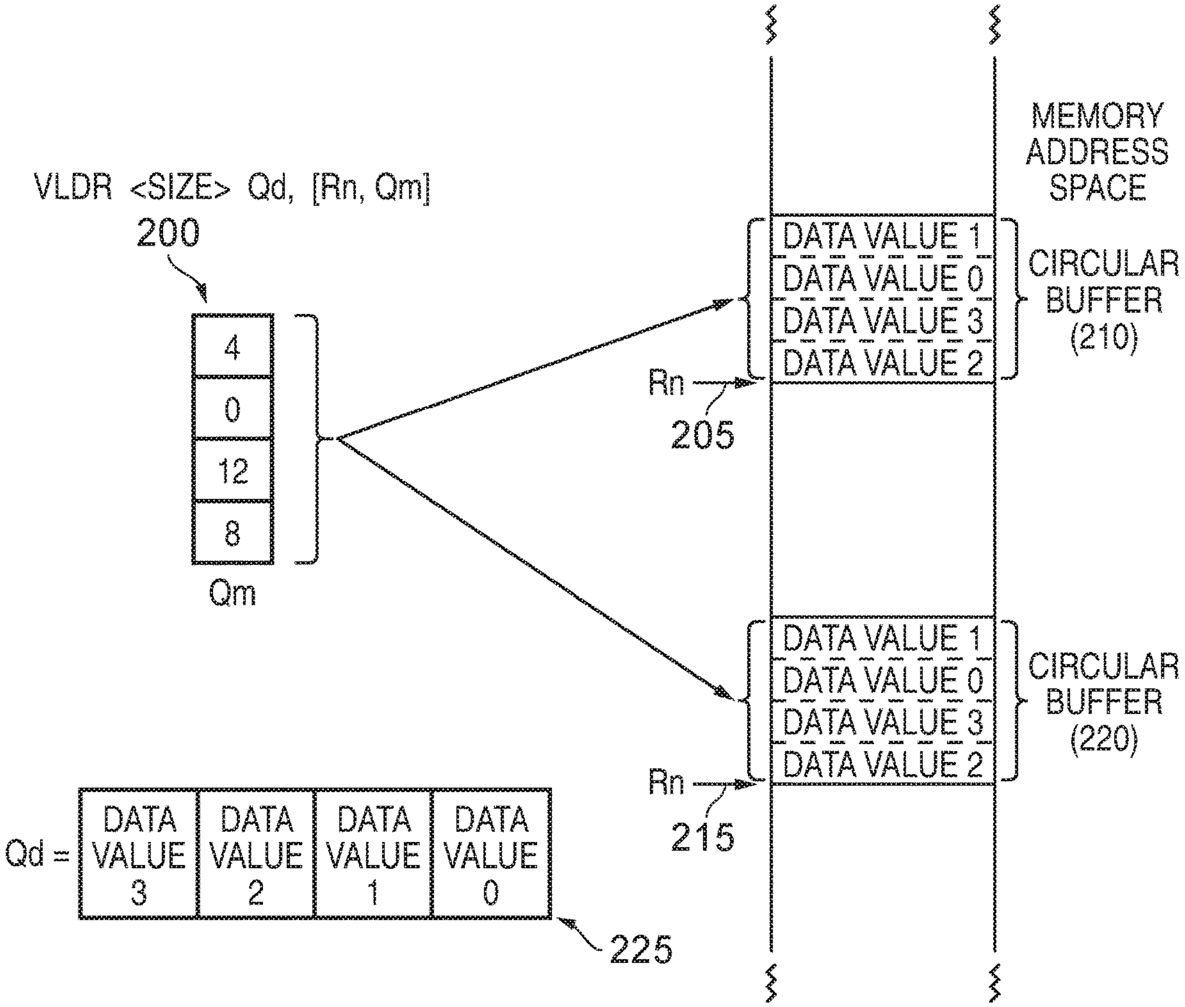

FIG. 5 illustrates how a vector of elements generated in the above described manner can then be used as an input operand for a vector memory access instruction. In particular, in the example of FIG. 5 it is assumed that the vector memory access instruction is a vector load instruction that is arranged to perform a gather of data values from locations in memory specified by a vector of address offsets Qm. The resultant data values are then stored as a elements within the result vector Qd. A scalar register Rn contains a base address in memory, which is combined with the vector of offsets to identify the individual addresses to be accessed. As with the vector generating instruction, the vector access instruction can include a size field to identify the size of the data values being processed.

Whilst such a vector load instruction can be used to gather data values from arbitrary addresses in memory, when the vector source register Qm is set to be the vector generated by execution of the VIWDUP or VDWDUP instruction, then it will be understood that the addresses accessed actually correspond to a circular buffer within memory. Hence, if we consider for example a situation where the vector of elements generated by an earlier VIWDUP instruction is as shown by the element 200 in FIG. 5, i.e. the same as the result in example three of FIG. 3 discussed earlier, where the vector is 128 bits in length, and the data values are 32-bit data values, then as shown in FIG. 5 a circular buffer will be accessed within the memory address space, with the start location of that circular buffer being dependent on the scalar value provided within the register Rn. Hence, if that scalar value has a first value 205, the circular buffer takes the form shown by the element 210, whereas if in another example the scalar value has the value 215, then the circular buffer is shown by the element 220. Hence, this approach provides a great deal of flexibility as to where the circular buffer is defined within the memory address space. When using the vector of offsets 200, then the data is retrieved from the relevant circular buffer and stored within the result vector register Qd to take the form 225 shown in FIG. 5.

Whilst as discussed earlier with reference to FIG. 4 the functionality performed when executing either the VIWDUP or VDWDUP instructions can be implemented as an iterative sequence, where one element of the vector is generated in each iteration, in some embodiments the vector generating circuitry can be arranged so as to enable multiple of the elements to be generated in parallel.

Figure 6:
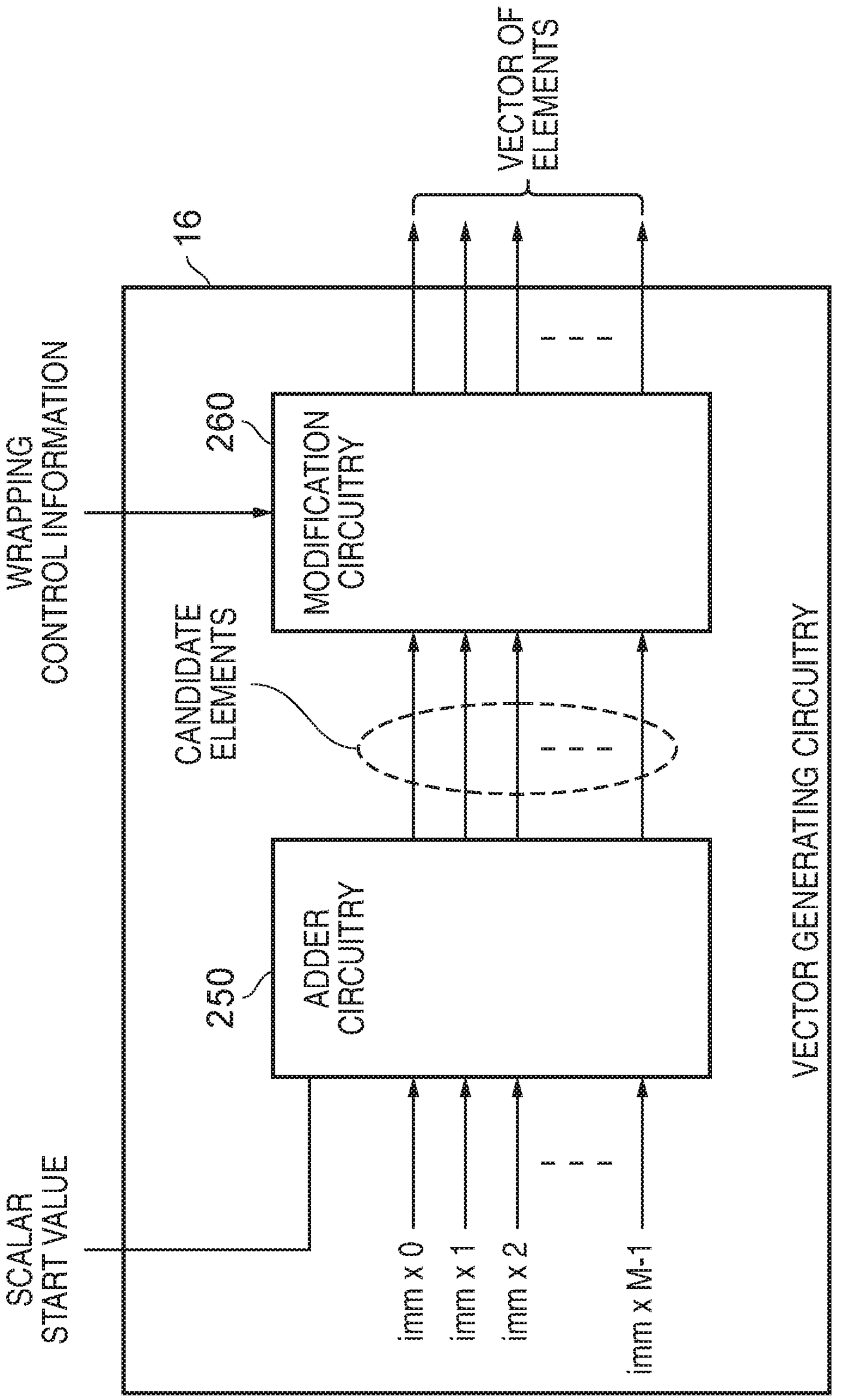

FIG. 6 is a block diagram illustrating one such arrangement of vector generating circuitry. In this example, adder circuitry 250 is provided which may in one embodiment contain a plurality of separate adder blocks, each adder block being arranged to generate a candidate element for the output vector. Modification circuitry 260 is then provided having a separate modification block corresponding to each of the adder blocks, each modification block selectively modifying the candidate element output by the corresponding adder block in dependence on whether a wrap condition is detected for that candidate element's value. The adder circuitry receives the scalar start value 250, and various multiples of the immediate value. The modification circuitry 260 receives the wrapping control information.

In one embodiment, both the adder circuitry 250 and the associated modification circuitry 260 may contain sufficient blocks to enable values for all of the elements of the vector to be computed in parallel. Alternatively, for at least some data value sizes it may be that the adder circuitry and modification circuitry do not have sufficient blocks to compute the values of all of the elements in parallel, but that values for all of the elements can be computed as a result of two or more passes through the adder circuitry and modification circuitry.

In the example shown in FIG. 6, it is assumed that the vector has M elements, and the adder circuitry 250 and modification circuitry 250 can generate all of the elements of the vector in parallel.

Figure 7A:
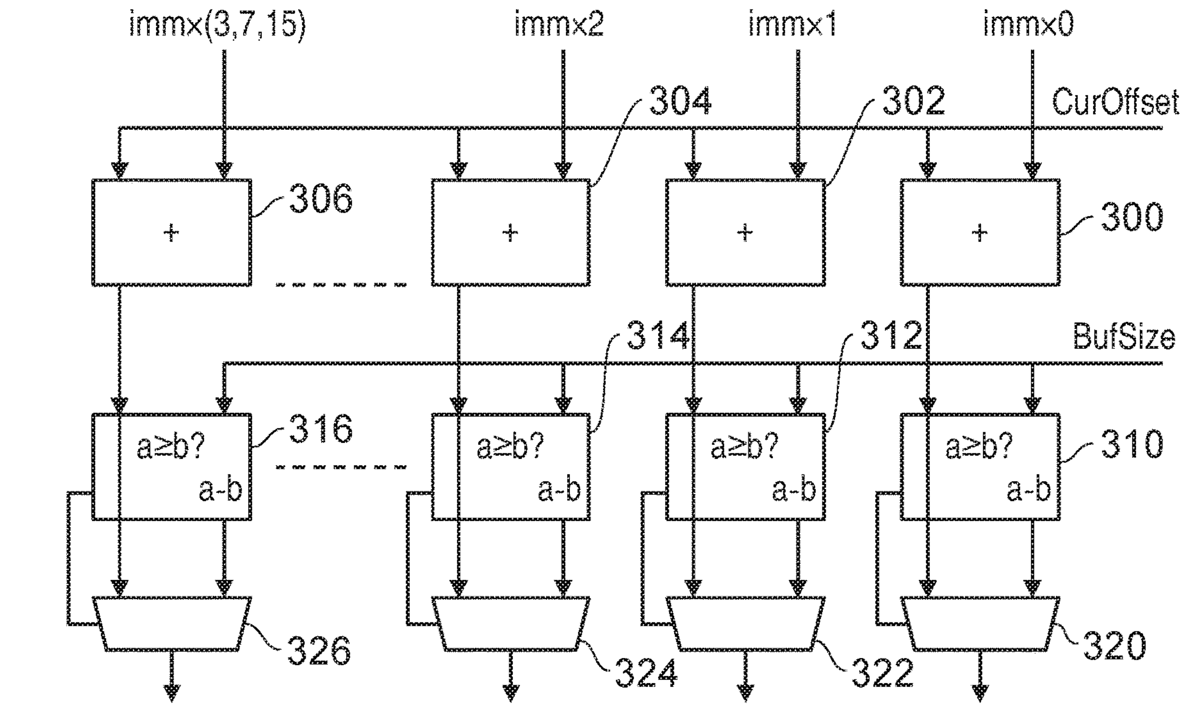

FIG. 7A illustrates one example form of the vector generating circuitry 16 of FIG. 6 used when processing a VIWDUP instruction, i.e. the incrementing version of the instruction. The adder circuitry in this instance comprises a sequence of adder blocks 300, 302, 304, 306, each of which is provided with an associated multiple of the immediate value, and the current offset, i.e. the scalar start value. It will be appreciated that the number of adder blocks required (assuming all of the elements of the vector are to be generated in a parallel) is dependent on the data value size. For the three examples discussed earlier with reference to FIG. 3, it will be seen that the vector to be generated will either have four elements, eight elements or sixteen elements, depending on the data value size (and assuming a vector length of 128 bits), and hence the final adder 306 in the sequence will either receive a second input corresponding to three times the immediate value, seven times the immediate value or fifteen times the immediate value.

In one embodiment, a single vector generating circuit can be provided having sixteen adder blocks and 16 modification blocks, and in instances where not all of the blocks are required, certain of the blocks can be turned off. Hence, only a quarter of the blocks will need to be activated when generating a vector having four elements, half of the blocks will need to be activated when generating a vector having eight elements, and all of the blocks will be activated when generating a vector having sixteen elements.

Each of the adder blocks 300 then adds the specified multiple of the immediate value to the current offset in order to generate a candidate element that is forwarded as one input to an associated comparison block 310, 312, 314, 316 within the modification circuitry 260. The other input to each comparison block is the buffer size value in this example embodiment. Each comparison block then determines whether the output from the associated adder block is greater than or equal to the buffer size. In addition, it computes a value (denoted as "a-b" in FIG. 7A) equivalent to subtracting the buffer size from the input received from the associated adder block. Each multiplexer circuit 320, 322, 324, 326 then receives the output from the associated adder block and the "a-b" output from the associated modification block, and is controlled in dependence on the output of the comparison performed by the comparison block. Hence, if it is determined that the output of the adder is not greater than or equal to the buffer size, then the output from the adder is output from the associated multiplexer, whereas if it is determined that the output from the adder is greater than or equal to the buffer size, then the output from the modification block is output from the multiplexer, i.e. an output corresponding to subtraction of the buffer size from the value output by the associated adder block.

Figure 7B:
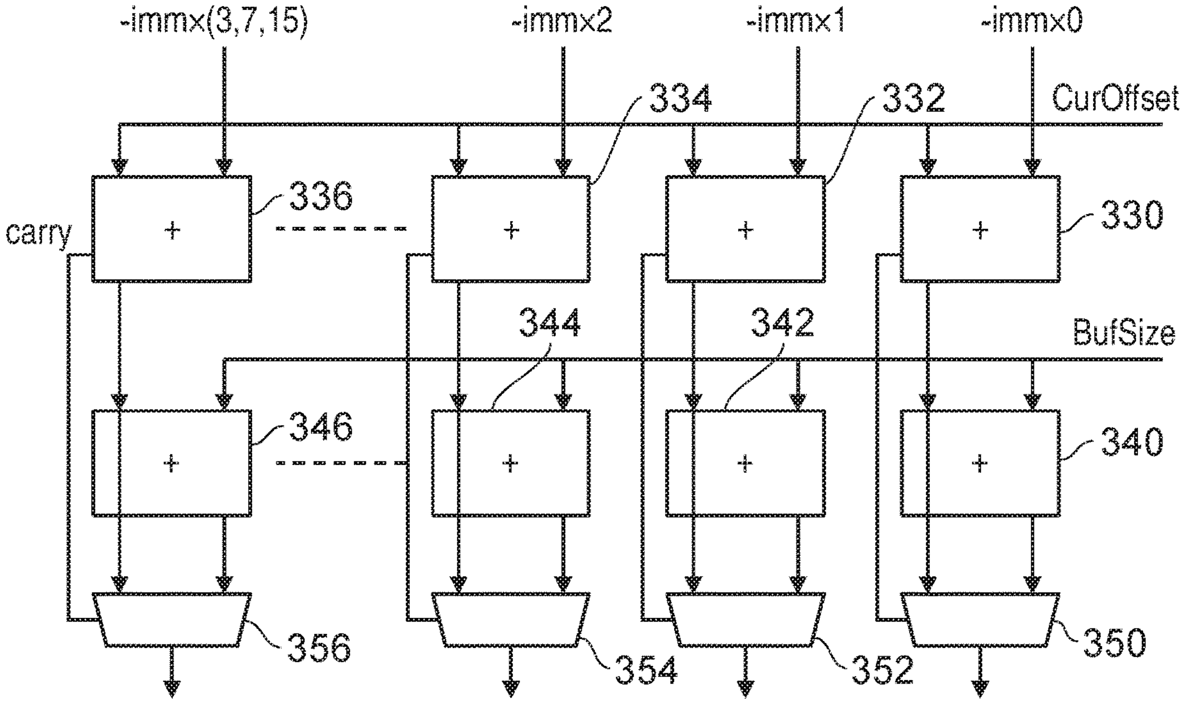

An example of circuitry that can be used to perform the operations required by the VDWDUP instruction in one embodiment is shown in FIG. 7B. Again, a series of adder blocks 330, 332, 334, 336 are provided, and again these receive as one input the current offset, and as the other input a multiple of the immediate value. However, in this example the multiple received is a negative multiple of the immediate value, causing the adders to perform a subtraction of that multiple of the immediate value from the current offset value. The output from the adder block is forwarded on to the modification circuitry, and in addition a carry out signal is also propagated on to the modification circuitry. In this example, the modification circuitry does not need to include comparison blocks, but instead can include further adder blocks 340, 342, 344, 346 which receive as one input the output from the associated adder blocks 330, 332, 334, 336 and receive as a second input the buffer size information. Each of the further adder blocks then adds the buffer size value to the output from the adder block and provides that value as a second input to the associated multiplexers 350, 352, 354, 356, the first input of each multiplexer being the output from the adder blocks 330, 332, 334, 336 of the adder circuitry 250. If the output from any of the adder blocks 330, 332, 334, 336 is a negative value, then the carry bit will indicate this, and this can be used to control the multiplexer accordingly, such that if the carry bit indicates a negative value, the multiplexer selects the output from the associated modification circuit block 340, 342, 344, 346 instead of the original output from the adder block 330, 332, 334, 336.

Figure 7C:
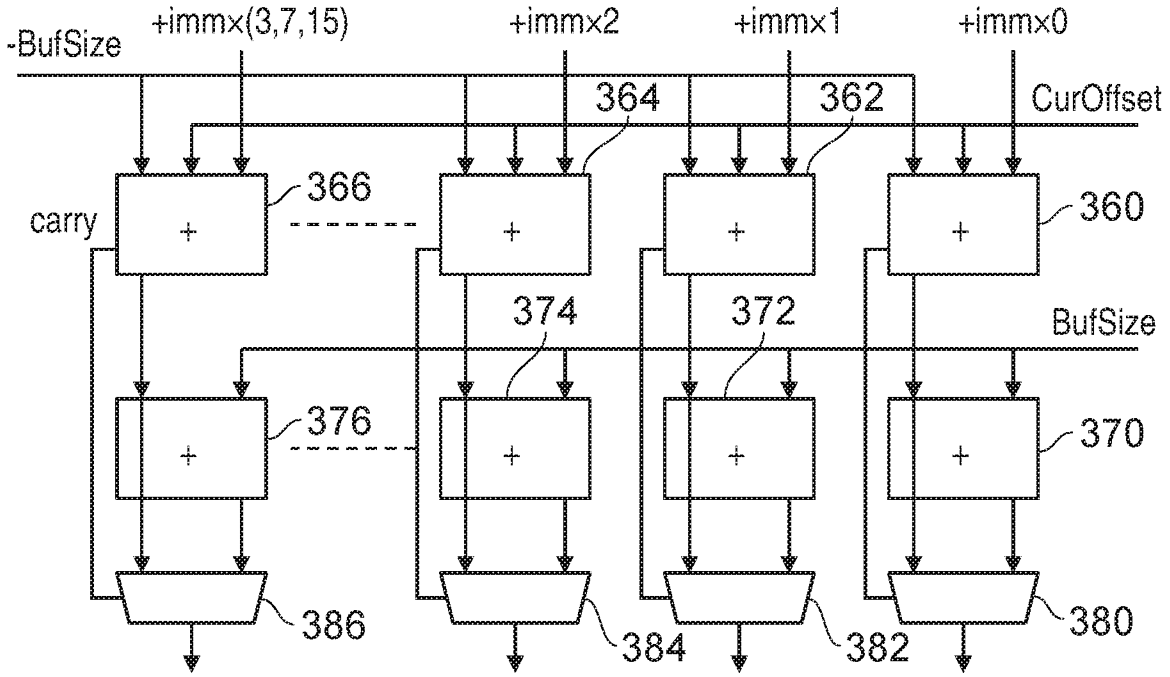

As can be seen from the above comparison of FIGS. 7A and 7B, the circuitry used when implementing the VDWDUP instruction can be significantly simplified, by use of the carry signal from the adder, thus avoiding the need for comparison circuitry. FIG. 7C illustrates an alternative arrangement of circuitry that can be used when implementing the VIWDUP instruction, which also enables the carry signal to be used to avoid comparison circuits. As shown in FIG. 7C, each of the adder blocks 360, 362, 364, 366 receives the current offset and the multiples of the immediate values as per the example circuitry of FIG. 7A, but in addition receives a third input of "-BufSize". As a result, this effectively causes the adders to subtract the buffer size from the current offset at the start, and as a result it is possible that some of the outputs from the adder will be negative, which will be indicated via the carry bit signal. The components 370, 372, 374, 376 correspond to the components 340, 342, 344, 346 of FIG. 7B. For any outputs that are negative, the associated multiplexers 380, 382, 384, 386 will select the adjusted output from the components 370, 372, 374, 376 in place of the original output from the adder blocks 360, 362, 364, 366.

Hence, when adopting the circuitry of FIG. 7C, execution of the VIWDUP instruction can be very efficiently performed in order to generate the elements of the vector in parallel, and without the requirement for comparison circuits. Adding three numbers instead of two is easily accommodated within the adders 360, 362, 364, 366 by using a row of full adders to "reduce" the three inputs to two addends to input to the carry-propagate adder.

Furthermore, it should be noted that the same circuitry can be used to perform the VDWDUP operation, merely be setting the "-BufSize" input to zero, and arranging for the multiples of the immediate to be subtracted instead of being added.

Figure 8:
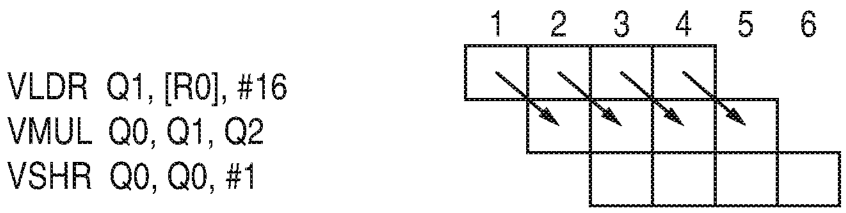
FIG. 8 shows an example of overlapped execution of vector instructions.

In some applications such as digital signal processing (DSP), there may be a roughly equal number of ALU and load/store instructions and therefore some large blocks such as the MACs can be left idle for a significant amount of the time. This inefficiency can be exacerbated on vector architectures as the execution resources are scaled with the number of vector lanes to gain higher performance. On smaller processors (e.g. single issue, in-order cores) the area overhead of a fully scaled out vector pipeline can be prohibitive. One approach to minimise the area impact whilst making better usage of the available execution resource is to overlap the execution of instructions, as shown in FIG. 8. In this example, three vector instructions include a load instruction VLDR, a multiply instruction VMUL and a shift instruction VSHR, and all these instructions can be executing at the same time, even though there are data dependencies between them. This is because element 1 of the VMUL is only dependent on element 1 of Q1, and not the whole of the Q1 register, so execution of the VMUL can start before execution of the VLDR has finished. By allowing the instructions to overlap, expensive blocks like multipliers can be kept active more of the time.

Hence, it can be desirable to enable micro-architectural implementations to overlap execution of vector instructions. However, if the architecture assumes that there is a fixed amount of instruction overlap, then while this may provide high efficiency if the micro-architectural implementation actually matches the amount of instruction overlap assumed by architecture, it can cause problems if scaled to different micro-architectures which use a different overlap or do not overlap at all.

Figure 9:
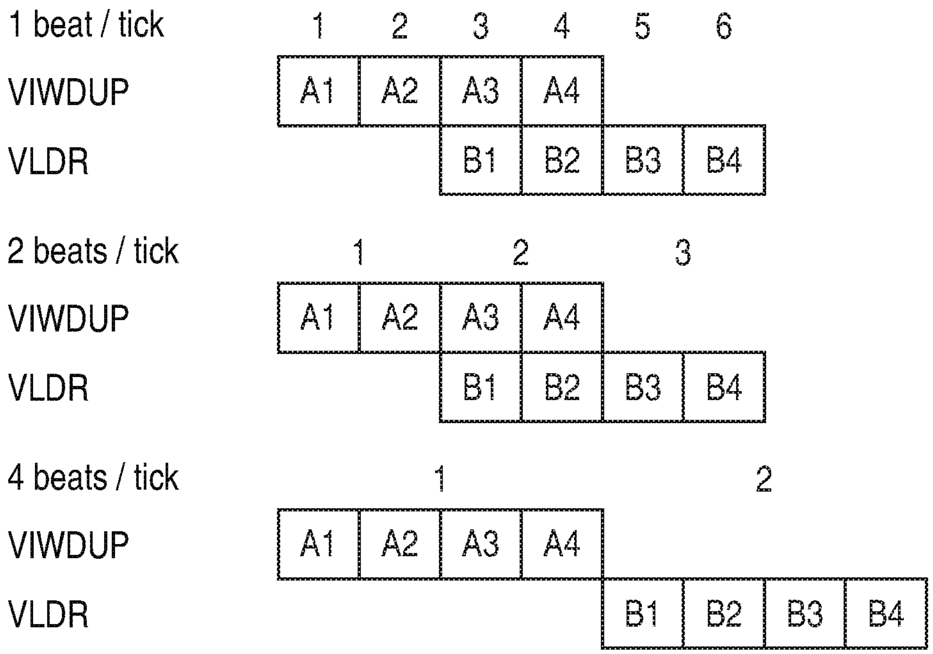
FIG. 9 shows three examples of scaling the amount of overlap between successive vector instructions between different processor implementations or at run time between different instances of execution of the instruction.

Instead, an architecture may support a range of different overlaps as shown in examples of FIG. 9. The execution of a vector instruction is divided into parts referred to as "beats", with each beat corresponding to processing of a portion of a vector of a predetermined size. A beat is an atomic part of a vector instruction that is either executed fully or not executed at all, and cannot be partially executed. The size of the portion of a vector processed in one beat is defined by the architecture and can be an arbitrary fraction of the vector. In the examples of FIG. 9 a beat is defined as the processing corresponding to one quarter of the vector width, so that there are four beats per vector instruction. Clearly, this is just one example and other architectures may use different numbers of beats, e.g. two or eight. The portion of the vector corresponding to one beat can be the same size, larger or smaller than the element size of the vector being processed. Hence, even if the element size varies from implementation to implementation or at run time between different instructions, a beat is a certain fixed width of the vector processing. If the portion of the vector being processed in one beat includes multiple elements, carry signals can be disabled at the boundary between respective elements to ensure that each element is processed independently. If the portion of the vector processed in one beat corresponds to only part of an element and the hardware is insufficient to calculate several beats in parallel, a carry output generated during one beat of processing may be input as a carry input to a following beat of processing so that the results of the two beats together form an element.

As shown in FIG. 9 different micro-architecture implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known micro-architecture techniques such as pipelining may mean that a single tick may require multiple clock cycles to perform at the hardware level, and indeed that a single clock cycle at the hardware level may process multiple parts of multiple instructions. However such micro-architecture techniques are not visible to the software as a tick is atomic at the architecture level. For conciseness such micro-architecture are ignored during further description of this disclosure.

As shown in the lower example of FIG. 9, some implementations may schedule all four beats of a vector instruction in the same tick, by providing sufficient hardware resources for processing all the beats in parallel within one tick. This may be suitable for higher performance implementations. In this case, there is no need for any overlap between instructions at the architectural level since an entire instruction can be completed in one tick.

On the other hand, a more area efficient implementation may provide narrower processing units which can only process two beats per tick, and as shown in the middle example of FIG. 9, instruction execution can be overlapped with the first and second beats of a second vector instruction carried out in parallel with the third or fourth beats of a first instruction, where those instructions are executed on different execution units within the processing circuitry (e.g. in FIG. 9 the first instruction is a vector increment and wrap instruction executed within a unit providing the vector generating circuitry and the second instruction is a load instruction executed using a load/store unit).

A yet more energy/area-efficient implementation may provide hardware units which are narrower and can only process a single beat at a time, and in this case one beat may be processed per tick, with the instruction execution overlapped and staggered for example by two beats as shown in the top example of FIG. 9.

It will be appreciated that the overlaps shown in FIG. 9 are just some examples, and other implementations are also possible. For example, some implementations of the processing circuitry 4 may support dual issue of multiple instructions in parallel in the same tick, so that there is a greater throughput of instructions. In this case, two or more vector instructions starting together in one cycle may have some beats overlapped with two or more vector instructions starting in the next cycle.

As well as varying the amount of overlap from implementation to implementation to scale to different performance points, the amount of overlap between vector instructions can also change at run time between different instances of execution of vector instructions within a program. Hence, the processing circuitry 4 and instruction decoder 6 may reference beat control circuitry 20 as shown in FIG. 1 used to control the timing at which a given instruction is executed relative to the previous instruction. This gives the micro-architecture the freedom to select not to overlap instructions in certain corner cases that are more difficult to implement, or dependent on resources available to the instruction. For example, if there are back to back instructions of a given type (e.g. multiply accumulate) which require the same resources and all the available MAC or ALU resources are already being used by another instruction, then there may not be enough free resources to start executing the next instruction and so rather than overlapping, the issuing of the second instruction can wait until the first has completed.

Accordingly, from the above description of FIG. 9, it can be seen that there is a great deal of flexibility as to how the vector generating instruction and associated memory access instruction are executed, but they can be closely coupled so as to cause the vector memory access instruction to consume the vector generated by the vector generating instruction relatively quickly. This can be useful, as the number of vector registers is typically a scarce resource, and accordingly by not requiring the vector generated by the vector generating instruction to be retained within the vector registers for a prolonged period, this can free up the vector register resources. The form of the vector generating instruction itself also assists in achieving this benefit, as no vector operand is required as a source operand to the vector generating instruction, and instead the vector generating instruction takes its inputs from either immediate values or scalar registers.

Figure 10:
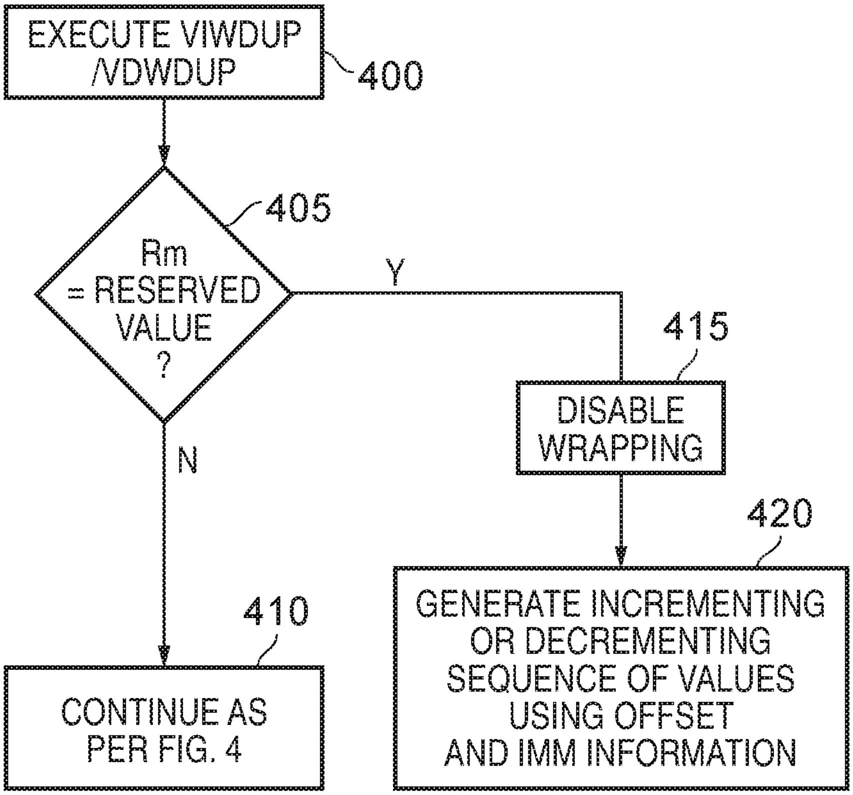
FIG. 10 is a flow diagram schematically illustrating how the wrapping functionality of the vector generating instruction may be selectively disabled in accordance with one embodiment.

In some embodiments, it is possible for the wrapping functionality provided by the vector generating instruction to selectively be disabled, and this is illustrated by way of example with reference to the flow diagram of FIG. 10. In particular, at step 400 the vector generating instruction is executed, and at step 405 it is determined whether the scalar register Rm (i.e. the register specifying the wrapping control information) is set to a reserved value. For instance, it could be that one or more of the scalar registers are not valid scalar registers to specify for such wrapping control information, and accordingly by setting the register Rm to one of those registers, this identifies that the wrapping functionality is to be disabled. In one particular example this may be achieved by specifying the program counter register as the register Rm. If the register Rm does not specify a reserved value, then as indicated by step 410 the process continues as usual, for example implementing the earlier-described process of FIG. 4. However, if the register Rm is a reserved value, then wrapping is disabled at step 415, and the vector generating circuitry at step 420 generates an incrementing or decrementing sequence of values using the offset and the immediate (i.e. adjust amount) values, but without any wrapping constraint. This can provide additional flexibility in the use of the VIWDUP and VDWDUP instructions (which in the wrapping disabled variant may be referred to as VIDUP and VDDUP instructions).

Further performance and efficiency benefits can be realised by constraining the specification of the scalar registers Rm and Rn. In particular, if one scalar register is constrained to be within a first group of scalar registers that is not overlapping with a group of scalar registers from which the other scalar register is chosen, then it may be possible to access the contents of both registers at the same time using the read access circuitry of the scalar register file 10, either with fewer read ports than would be required if the registers were not constrained in such a way, or with the register file split into two independent banks. This is illustrated schematically in FIG. 11, where the two groups are even and odd registers. Hence, all of the even registers R0 455, R2 465, etc. are within one group, and all of the odd registers R1 460, R3 470, etc. are within a further group. If the scalar start value is constrained to be specified by a register within one of the those groups, whilst the wrapping control information is specified by a register within the other group, then as shown by the read access circuitry 450 in FIG. 11, it is possible using the outputs from the multiplexers 475 and 480 to access both the contents of an odd register and an even register via a single read port. This is achieved by tapping off those values before they are input to the final multiplexer 485, the final multiplexer 485 still allowing a single register output to be read if desired.

Whilst in FIG. 11 the example is illustrated with regard to groups of even registers and groups of odd registers, more generally the same benefit can be achieved by constraining the register specifying the offset and the register specifying the buffer size to be from non-overlapping portions of the scalar register set.

The following is an example sequence of code illustrating how the proposed instructions discussed above could be used to efficiently allow the use of a circular memory:

```
        MOV             r8, #0
        MOV             r9, #0
        MOV             r10, #0
        WLSTP.32        lr, %[loops], loop1End
loop1Start:
        VLDRW.32        q0, [%[srcCoeff]], 0x10
        VIWDUP.32       q7, r10, %[circ_buff_size], 0x4
        VLDRW.32        q1, [%[srcSamplesCircular], q7]
        VMLALZA.S32     r9, r8, q0, q1
        LE              lr, loop1Start
loop1End:
```

The first three move instructions are used to initialise the contents of the scalar registers r8, r9 and r10 to logic zero values, and then the WLSTP instruction sets up a loop, storing the number of loops into the link register. The VLDRW instruction then performs a contiguous load of data from an address specified in a scalar register (indicated as "srcCoeff") and stores the resultant data values in the vector register q0, the instruction then also incrementing the address in the scalar register. The VIWDUP instruction then operates as discussed earlier to generate a vector of offsets stored within the vector register q7. Since the data value size is 32 bits, the immediate value is four. The subsequent VLDRW instruction then uses the contents of the vector register q7, and a base address specified in a source register (referred to as "srcSamplesCircular") to access in memory data values that are then stored within the vector register q1. A vector multiply accumulate operation is then performed, where each element in q0 is multiplied with the corresponding element in q1 and then accumulated within a scalar value held within the registers r8 and r9. This process continues through multiple iterations of the loop until the required number of loops has been performed.

As discussed earlier, one type of vector memory access operation that can be performed accesses a plurality of data values in memory at addresses determined from an address vector operand comprising a plurality of address elements. Whilst the address vector operand may directly specify the individual addresses to be accessed, often the address vector operand specifies a vector of offsets, which are combined with a base address in order to identify the addresses to be accessed. Such operations allow data to be accessed in arbitrary memory locations, and are often referred to as gather operations when loading data from addresses in memory into the individual elements of a vector, or scatter operations when storing the individual elements from a vector to the identified address locations.

Due to the fact that the addresses involved in such scatter or gather operations can be arbitrary, the processing of such operations typically requires the various access requests to be serialised, such that a series of independent load or store operations are performed. In the cases where the accesses are indeed arbitrary, this is reasonable and necessary. However, it has been realised that there are an increasing number of cases where such scatter or gather type memory access operations are used, but where at least some of the addresses to be accessed are in fact consecutive, and accordingly multiple of the data values could be accessed via a single access to contiguous addresses in the memory. One particular example of this is when using the earlier-described vector increment and wrap or vector decrement and wrap instructions to generate the vector of offsets that are then used when performing a gather or scatter operation, since the addresses will be consecutive other than where a wrap point is reached.

However, in vector processing systems the access path to memory is often a critical timing path, and accordingly it is typically not practical to provide circuitry within the memory access path to analyse the addresses at the time the vector memory access operation is to be processed.

As will be described with reference to the remaining figures, certain embodiments can provide a mechanism for alleviating this problem. FIG. 12 schematically illustrates an example embodiment incorporating components aimed at identifying when certain sequences of addresses will be contiguous, hence assisting the load/store unit in reducing the number of accesses required in such situations. As will be seen from a comparison of FIG. 12 with FIG. 1, FIG. 12 illustrates an apparatus 2' which is essentially the apparatus 2 of FIG. 1, but with some additional components. In particular, the processing circuitry 4' includes all of the components provided within the processing circuitry 4 of FIG. 1, but in addition has flag setting circuitry 500 that can be arranged to set flag information on determination that a vector generated for storage in one of the vector registers 12 comprises a plurality of elements that meet specified contiguousness criteria. The flag information generated by the flag setting circuitry can be stored in a variety of locations. For example, a flag information storage 505 can be provided in association with the flag setting circuitry for storing the flag information. Alternatively, the flag information storage 510 can effectively be incorporated within the vector register file 12 by providing a number of additional bits in association with each vector register to capture the necessary flag information.

If for a particular vector register the flag setting circuitry 500 sets flag information to identify that at least a portion of that vector register has elements whose values meet specified contiguousness criteria, then when the load/store unit subsequently performs a gather or scatter operation using a vector of offsets that is specified with reference to that register, it can utilise the flag information to determine which address elements are contiguous, and hence potentially reduce the number of accesses to the memory system 8 required in order to perform the gather or scatter operation. In the absence of the flag information being set, then the load/store unit will handle the gather or scatter operation in the standard manner. This may involve requiring the load/store unit 18 to treat each address element as identifying a discontiguous address, and hence performing separate accesses for each address element. Alternatively, some other components may be provided within the memory access path to seek to at least partially optimise the accesses. To the extent that such additional circuitry is provided, it can be used in addition to the flag information mechanism described herein.

The specified contiguousness criteria that the flag setting circuitry 500 seeks to determine the presence or absence of can take a variety of forms, but in one embodiment requires at least a subset of the elements in the vector to have values that follow a regularly progressing sequence. The flag information is then set so as to enable the processing circuitry to determine which elements in the vector have values that follow the regularly progressing sequence.

FIG. 13A illustrates entries that may be provided within the flag information storage 505 in accordance with one embodiment. In this example, multiple entries are provided, each entry having a register ID field 515 to identify the register to which the entry relates, and a valid flag field 517 comprising one or more valid flags. In one embodiment, a single valid flag can be used in association with the entire vector, and will only be set if all of the elements in the vector follow the regularly progressing sequence. Alternatively, multiple valid flags may be provided within the valid flags field 517, each flag being associated with a different portion of the vector and being set dependent on whether the associated portion contains elements that follow a regularly progressing sequence. If desired, additional information can also be captured to identify whether the regularly progressing sequence extends between multiple portions. Hence, by way of example, if there are four valid flags relating to four portions in the vector, and the valid flags indicate that portions 2 and 3 both contain elements following the regularly progressing sequence, the flag information can additionally capture, if desired, whether the regularly progressing sequence in portion 3 is a non-interrupted continuation of the regularly progressing sequence in portion 2.

The regularly progressing sequence being looked for can take a variety of forms, but in one embodiment is such that contiguous memory addresses will result from the values that follow the regularly progressing sequence if those values are used as address elements for memory access operations. As discussed earlier, it may be that only a single data value size is supported, and hence the regularly progressing sequence will relate to values that identify consecutive addresses having regard to that data value size. However, in alternative embodiments multiple different data value sizes may be supported, and in that instance a size field 519 can be provided within each entry to identify the size of the data value to which the flag information relates. In particular, it will be appreciated that a sequence of values may be used to represent contiguous addresses when the data values are of one size, but that same sequence of values will not necessary represent contiguous addresses if the data values are of a different size.

As another example, it may be that the system supports multiple data value sizes, but that the flag setting mechanism of the described embodiments is only implemented in respect of data values of a particular size. For example, it may be decided to implement the flag setting technique when the data values being processed are byte sized data values, but not to implement the flag setting technique when the data values are of any larger size. In such instances, the size information field 519 may not be required.

Similarly, it may be that the use of the flag setting technique is limited to one or more particular vector registers, and each entry in the flag information storage may be directly associated with a particular register. In that event, it may not be necessary to provide the register identifier field 515.

In a further alternative embodiment, the flag information may be retained for only a single register, in particular to provide flag information for the last used vector. In such an embodiment, if the code is structured in a way that the instruction immediately preceding the memory access instruction generates a vector of elements that can represent consecutive offsets, then the implementation merely checks that the same vector is used as the offset register for the memory access instruction and then reads the flag information accordingly. Again, this avoids any specific need for a register identifier to be captured within the flag information.

FIG. 13B illustrates an example arrangement of an alternative flag information storage 510 that is provided in combination with the vector registers of the vector register file 12. For each vector register 520, a corresponding valid flag field 522 could be provided to store the one or more valid flags associated with that register. A size information field 524 can also be provided if required. With such an approach, valid flag information can potentially be retained simultaneously for each of the vector registers in the vector register file 12.

FIG. 14 is a flow diagram illustrating how the flag information is used when executing vector memory access operations. At step 550, it is determined that a vector memory access operation is to be performed. In particular, in one embodiment, at this point the load/store unit 18 determines that it has a vector memory gather or scatter operation to perform. For other types of vector load or store instructions that inherently identify contiguous addresses in memory, there is no need for the flag information, and those accesses can be handled in the standard way taking advantage of the known contiguous nature of the addresses. However, as mentioned earlier, for scatter or gather type operations, these may potentially be to arbitrary addresses in memory, but the presence of flag information in association with the vector register used to provide the address offset information can enable the load/store unit to determine whether any of the address elements do in fact relate to contiguous addresses, and to use that information to potentially reduce the number of accesses required.

Accordingly, at step 555, it is determined whether flag information is associated with the vector register that provides the address vector operand, in one embodiment this being the vector of address offsets that are then combined with a base address in order to identify the addresses to access. If flag information is associated with that vector register, then at step 560 the flag information is used by the load/store unit 18 when determining the number of accesses to memory required to access the data values. However, otherwise, the process proceeds to step 565 where the gather or scatter operation is performed in the standard manner in order to access the data values.

FIGS. 15A to 15C illustrate various examples for the offset values provided as an input to a vector load instruction specifying a vector gather operation. In this example, it is assumed that the vector load instruction is loading four 32-bit data values into a 128-bit destination register Qd, with the offset information being provided within the source vector register Qm, and the base address being specified in the scalar register Rn. In the example shown in FIG. 15A, it is assumed that the vector of offsets 570 provides a regularly increasing sequence of values which can be used to generate contiguous addresses for four 32-bit data values. Also in this example, it is assumed that the flag information 572 has a single valid flag which is set to identify that the regularly progressing sequence relates to the entire vector width. The size information field is also set to identify that the assumed data size is 32 bits, and the register ID field is set to identify that the flag information relates to the register Qm. Since the vector load instruction is operating on 32-bit quantities, then when the flag information is referred to, it is determined that the size information matches, and the register ID matches the source register Qm. Since the valid flag is set, the load/store unit hence knows that all of the address elements follow a regularly progressing sequence that will cause contiguous addresses in memory to be identified when combined with the base address.

How the load/store unit 18 uses the information will depend on a number of factors, including the memory access bandwidth available. For example, if a 64-bit memory access bandwidth is supported, then based on the information shown in FIG. 15A, the load/store unit can perform two 64-bit accesses, each directed to two contiguous addresses, hence enabling two data values to be retrieved by each access. If instead a 128-bit memory access bandwidth is supported, then the load/store unit 18 can perform one 128-bit access directed to four contiguous addresses in order to retrieve all four data values via a single access.

FIG. 15B illustrates a second example, where the flag information has two valid flags within the valid flag field, and accordingly the flag information takes the form 576 for the particular example vector of elements 574. Hence, in this example, if at least a 64-bit memory access is supported, the load/store unit can issue a single access in order to retrieve the first two data values. Separate accesses will then typically be needed to obtain the third data value and the fourth data value.

In the event that both valid flags are set, due to both the lower half and the upper half of the source vector register Qm containing elements following the required progressing sequence, then optionally some additional information can be captured to identify whether there is a continuity between the two halves. For example, if Qm held the elements 20, 16, 4, 0, both valid flags would be set, but this additional information would not be set, whereas if Qm held the values 12, 8, 4, 0, then both valid flags would be set, and in addition this further flag would be set to identify the continuity between the two halves. This can be useful in certain situations. For example, if the memory access path has a bandwidth of 128 bits, this additional information could be used to determine whether two 64-bit contiguous accesses needed to be issued, or whether a single 128-bit contiguous access could be issued.

FIG. 15C illustrates a yet further example where the source vector of offsets takes the form 580, and the flag information takes the form 582. In this instance, the flag information field does not simply contain a series of flags, but instead provides sufficient information to identify which of the elements represent contiguous addresses. In this example, the first three elements in the vector have the required pattern, and that information can be captured within the flag field. It will be appreciated that this could be captured in a variety of ways. For example a start element and an end element of contiguity could be identified, or a starting element for a contiguous sequence could be identified, along with a number of elements that are then contiguous.

In one embodiment, the flag setting circuitry 500 can be arranged to invalidate the flag information on occurrence of one or more specified events. In particular, in one embodiment as shown in FIG. 16A, if it is determined that an exception occurs at step 600, then the flag information is invalidated at step 605. Hence, an exception forms one of the specified events that causes the flag information to be invalidated.

FIG. 16B illustrates another example of a specified event, in this instance the specified event being when the processing circuitry writes to a vector register that has flag information associated with it. Given that a write operation has occurred, the flag information can no longer be assumed to be accurate, and accordingly is invalidated. At step 610, it is determined whether the current instruction writes to a vector register, and if so at step 615 it is determined whether valid flag information is stored for that vector register. If it is, then the flag information for that vector register is invalidated at step 620. Thereafter at step 625 the instruction is executed. If the no path is followed from either step 610 or step 615 then the process proceeds directly to step 625 to execute the instruction, and any flag information is retained.

By arranging for the flag information to be invalidated on the occurrence of such events, this means that the flag information does not have to be architecturally visible, and so does not need to be saved and restored around exceptions. This simplifies the implementation of the flag setting mechanism.

There are a number of mechanisms that can be used to trigger the flag setting circuitry 500 to generate flag information for a vector of elements. FIG. 17 illustrates one example arrangement where the flag setting circuitry is triggered upon execution of one of the earlier-described VIWDUP or VDWDUP instructions. In particular, if at step 650 it is determined that one of these instructions is executed, then at step 655 whilst the vector generating circuitry 16 executes that instruction, it provides information to the flag setting circuitry 500 to identify if a wrap occurs within the vector generated and, if so, where that wrap occurred within the vector.

At step 660, the flag setting circuitry then analyses that information and sets the flag information accordingly for the relevant register. In particular, if no wrap occurs, then it is known that for the data value size identified for that VIWDUP or VDWDUP instruction, the vector of elements will represent contiguous addresses if that vector is used as an input to a subsequent gather or scatter operation relating to the same data value size, and accordingly the valid flag or valid flags can be set. Similarly, if there is a wrap point, it can still be determined which elements within the vector represent contiguous addresses, and the flag information can be set accordingly. In such instances, it will depend on the nature and granularity of the flag information that is being produced as to whether any valid flags can be set to identify at least portions of the vector that contain elements that relate to contiguous addresses.

FIG. 18 illustrates another mechanism that can be used to invoke the flag setting circuitry 500, either instead of the approach of FIG. 17, or in addition to using the approach of FIG. 17. At step 665, it is determined whether there is a new instruction to decode, and if so the decoding circuitry determines at step 670 if execution of that instruction will create a vector whose elements have values following a regularly progressing sequence. For example, there may be certain instructions that it is known will create a regularly progressing sequence when they are executed, that could be used to represent address offsets for contiguous addresses for a particular data value size. If such a determination is made at step 670, then at step 675 the decoder circuitry sends a control signal to the flag setting circuitry to cause the flag setting circuitry to set the flag information for the relevant vector register when that instruction is subsequently executed within the processing circuitry 4'. In addition, at step 680, control signals are generated to cause the processing circuitry to perform the operation required by the instruction, prior to the process returning to step 665. If at step 670 it is determined that execution of the instruction will not be guaranteed to create a vector whose elements have values following a regularly progressing sequence, then the process proceeds directly to step 680, bypassing step 675.

FIG. 19 illustrates a yet further mechanism that could be used to invoke the flag setting circuitry, either instead of, or in addition to, the mechanisms discussed in FIGS. 17 and 18.

In this example, it is determined at step 685 whether a vector has been loaded from memory. When it is determined that a vector has been loaded from memory into one of the vector registers, then comparison circuitry within the flag setting circuitry can be invoked at step 690 to analyse the elements of the vector to identify whether at least a subset of the elements have values following a regularly progressing sequence (this can be analysed for a variety of different possible data value sizes). The flag information can then be set accordingly as a result of the analysis performed by the flag setting circuitry. It will be appreciated that the comparison operations identified in FIG. 19 can be performed by circuitry that is not on the critical access path to memory, and at a convenient point in the operation of the system which will not impact on the performance of the processing circuitry. Once the flag information has been generated, then if that vector is subsequently used as an input vector of address offsets for a gather or scatter operation, the flag information could be referred to in order to potentially reduce the number of accesses to memory required to process the gather or scatter operation.

The following code sequence illustrates an example of how the flag setting mechanism can improve performance:

```
VIWDUP.8    q7, r0, r2, #1           // q0 = [0,1,2,...,15]
VLDRW.8     q1, [%[basePtr], q7]
```

Execution of the VIWDUP instruction creates a monotonically incrementing vector value, with only rare cases where this wraps. In one example implementation, the flag setting circuitry could set a flag per word (i.e. 32 bits), stating that all elements within that word are monotonically incrementing. When the vector load instruction is then subsequently executed these flags can be read, and instead of processing the gather load normally, a contiguous load could be issued instead wherever these flags indicate consecutive elements.

FIG. 20 illustrates a virtual machine implementation that may be used. Whilst the earlier described embodiments implement the present technique in terms of apparatus and methods for operating specific processing hardware supporting the techniques concerned, it is also possible to provide so-called virtual machine implementations of hardware devices. These virtual machine implementations run on a host processor 750 running a host operating system 740 supporting a virtual machine program 730. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 730 provides a virtual hardware interface to an guest program 720 which is the same as the hardware interface which would be provided by the real hardware which is the device being modelled by the virtual machine program 730. Thus, the program instructions, including those used to control memory accesses described above, may be executed from within the guest program 720 using the virtual machine program 730 to model their interaction with the virtual machine hardware. The guest program 720 may be a bare metal program, or alternatively it may be a guest operating system that runs applications in a similar way to how Host OS 740 runs the virtual machine application 730. It will also be appreciated that there are different types of virtual machine, and in some types the virtual machine runs directly on the host hardware 750 without the need for a host OS 740.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry to perform vector processing operations; and an instruction decoder to decode vector instructions to control the processing circuitry to perform the vector processing operations specified by the vector instructions, the vector instructions including a vector generating instruction identifying a scalar start value, vector element value wrapping control information providing size information indicative of a first bound, and an adjust amount;

wherein the instruction decoder is responsive to the vector generating instruction to control the processing circuitry to generate, based on the scalar start value and the vector element value wrapping control information, a vector comprising a plurality of elements, the processing circuitry being arranged to generate the vector such that the first element in said plurality is dependent on the scalar start value, and the values of the plurality of elements follow a regularly progressing sequence that is constrained to wrap as required to ensure that each value specified by the plurality of elements of the vector is within bounds comprising the first bound identified by the vector element value wrapping control information and a predetermined second bound;

wherein the processing circuitry is configured to determine, based on the adjust amount, a difference between values of adjacent elements in the regularly progressing sequence; and wherein for each element in the vector other than the first element, the processing circuitry is configured to determine, based on the vector element value wrapping control information, whether a wrap condition is present, and to generate that element based on whether the wrap condition is present.

2. An apparatus as claimed in claim 1, wherein:

the vector generating instruction specifies a first scalar register providing said scalar start value.

3. An apparatus as claimed in claim 1, wherein the vector element value wrapping control information is identified within the vector generating instruction with reference to one of an immediate value and a register.

4. An apparatus as claimed in claim 1, wherein the second bound is a zero value.

5. An apparatus as claimed in claim 1, wherein the vector generating instruction is constrained to meet at least one of the following conditions:

a buffer size determined from the vector element value wrapping control information is a multiple of the adjust amount;

the scalar start value is a multiple of the adjust amount;

the buffer size exceeds a size value determined by multiplying the number of elements in the vector by the adjust amount.

6. An apparatus as claimed in claim 1, wherein the processing circuitry is controlled by the decoder circuitry in response to the vector generating instruction to generate said vector such that the values of the plurality of elements follow a regularly increasing sequence that is constrained to wrap as required to ensure that each value is within the bounds determined from the vector element value wrapping control information.

7. An apparatus as claimed in claim 1, wherein the processing circuitry is controlled by the decoder circuitry in response to the vector generating instruction to generate said vector such that the values of the plurality of elements follow a regularly decreasing sequence that is constrained to wrap as required to ensure that each value is within the bounds determined from the vector element value wrapping control information.

8. An apparatus as claimed in claim 1, wherein:

the decoder circuitry is responsive to a vector memory access instruction to control the processing circuitry to access in memory a plurality of data values at addresses determined by an input address vector operand comprising a plurality of address elements; and the apparatus is arranged to execute a sequence of instructions comprising said vector generating instruction and an associated vector memory access instruction, the associated vector memory access instruction identifying as said input address vector operand the vector generated by the vector generating instruction, such that the plurality of data values are accessed within a circular buffer within the memory.

9. An apparatus as claimed in claim 8, wherein the associated vector memory access instruction identifies a base address providing a start address of the circular buffer, and the input address vector operand specifies as the plurality of address elements a vector of address offsets to be combined with the base address in order to identify each address to be accessed.

10. An apparatus as claimed in claim 8, wherein:

in response to a given vector instruction, the processing circuitry is configured to perform a plurality of beats of processing each corresponding to a section of a vector value; and the processing circuitry is configured to support overlapped execution of said vector generating instruction and said associated vector memory access instruction, in which a first subset of beats of the associated vector memory access instruction is performed in parallel with a second subset of beats of the vector generating instruction.

11. An apparatus as claimed in claim 1, wherein the instruction decoder is responsive to a specified condition being detected when decoding the vector generating instruction, to disable use of the vector element value wrapping control information by the processing circuitry, such that the processing circuitry is arranged to generate the vector such that the first element in said plurality is dependent on the scalar start value, and the values of the plurality of elements follow the regularly progressing sequence without any wrapping constraint.

12. An apparatus as claimed in claim 11, wherein said specified condition comprises a reserved value being used to identify the vector element value wrapping control information.

13. An apparatus as claimed in claim 1, further comprising:

a set of scalar registers;

wherein the vector generating instruction specifies a first scalar register providing said scalar start value, and a second scalar register identifying the vector element value wrapping control information, and specification of the first and second scalar registers is constrained such that the first scalar register is chosen from a first group of scalar registers in said set that is non-overlapping with a second group of registers in said set from which the second scalar register is chosen.

14. A non-transitory computer-readable storage medium storing a virtual machine computer program comprising program instructions to control a host data processing apparatus to provide an instruction execution environment corresponding to the apparatus according to claim 1.

15. An apparatus comprising:

processing circuitry to perform vector processing operations; and an instruction decoder to decode vector instructions to control the processing circuitry to perform the vector processing operations specified by the vector instructions;

wherein the instruction decoder is responsive to a vector generating instruction identifying a scalar start value and vector element value wrapping control information, to control the processing circuitry to generate, based on the scalar start value and the vector element value wrapping control information, a vector comprising a plurality of elements, the processing circuitry being arranged to generate the vector such that the first element in said plurality is dependent on the scalar start value, and the values of the plurality of elements follow a regularly progressing sequence that is constrained to wrap as required to ensure that each value specified by the plurality of elements of the vector is within bounds determined from the vector element value wrapping control information; and wherein for each element in the vector other than the first element, the processing circuitry is configured to determine, based on the vector element value wrapping control information, whether a wrap condition is present, and to generate that element based on whether the wrap condition is present, wherein:

the processing circuitry comprises adder circuitry to generate a plurality of candidate elements for said vector using an input value derived from the scalar start value and a sequence of regularly progressing adjust values; and modification circuitry to generate from each candidate element an output element for inclusion within said vector, for each candidate element the modification circuitry being arranged to determine whether the wrap condition is present, and in the presence of said wrap condition to perform an arithmetic operation to modify the candidate element based on the vector element value wrapping control information in order to generate the output element, and otherwise to use the candidate element unmodified as the output element.

16. An apparatus as claimed in claim 15, wherein:

the processing circuitry is controlled by the decoder circuitry in response to the vector generating instruction to generate said vector such that the values of the plurality of elements follow a regularly decreasing sequence that is constrained to wrap as required to ensure that each value is within the bounds determined from the vector element value wrapping control information; and the adder circuitry comprises a separate adder block to generate each candidate element by subtracting an associated one of the adjust values from the input value, and a carry out signal from each adder block is used to determine whether the wrap condition is present for the associated candidate element.

17. An apparatus as claimed in claim 15, wherein:

the processing circuitry is controlled by the decoder circuitry in response to the vector generating instruction to generate said vector such that the values of the plurality of elements follow a regularly increasing sequence that is constrained to wrap as required to ensure that each value is within the bounds determined from the vector element value wrapping control information;

the input value is derived from the start address by subtracting from the scalar start value an upper bound value derived from the vector element value wrapping control information; and the adder circuitry comprises a separate adder block to generate each candidate element by adding an associated one of the adjust values to the input value, and a carry out signal from each adder block is used to determine whether the wrap condition is present for the associated candidate element.

18. An apparatus as claimed in claim 15, wherein the modification circuitry is arranged, in the presence of said wrap condition, to perform as said arithmetic operation an addition of an upper bound value derived from the vector element value wrapping control information to the candidate element in order to generate the output element.

19. A method of operating an apparatus having processing circuitry to perform vector processing operations, and an instruction decoder to decode vector instructions to control the processing circuitry to perform the vector processing operations specified by the vector instructions, the method comprising:

decoding a vector generating instruction identifying a scalar start value, vector element value wrapping control information providing size information indicative of a first bound, and an adjust amount; and responsive to said decoding, controlling the processing circuitry to generate, based on the scalar start value and the vector element value wrapping control information, a vector comprising a plurality of elements, the processing circuitry generating the vector such that the first element in said plurality is dependent on the scalar start value, and the values of the plurality of elements follow a regularly progressing sequence that is constrained to wrap as required to ensure that each value specified by the plurality of elements of the vector is within bounds comprising the first bound identified by the vector element value wrapping control information and a predetermined second bound;

determining, based on the adjust amount, a difference between values of adjacent elements in the regularly progressing sequence; and for each element in the vector other than the first element, the processing circuitry determining, based on the vector element value wrapping control information, whether a wrap condition is present, and generating that element based on whether the wrap condition is present.

20. An apparatus comprising:

processing means for performing vector processing operations; and instruction decoder means for decoding vector instructions to control the processing means to perform the vector processing operations specified by the vector instructions, the vector instructions including a vector generating instruction identifying a scalar start value, vector element value wrapping control information providing size information indicative of a first bound, and an adjust amount;

the instruction decoder means for controlling, responsive to the vector generating instruction, the processing means to generate, based on the scalar start value and the vector element value wrapping control information, a vector comprising a plurality of elements, the processing means for generating the vector such that the first element in said plurality is dependent on the scalar start value, and the values of the plurality of elements follow a regularly progressing sequence that is constrained to wrap as required to ensure that each value specified by the plurality of elements of the vector is within bounds comprising the first bound identified by the vector element value wrapping control information and a predetermined second bound;

the processing means for determining, based on the adjust amount, a difference between values of adjacent elements in the regularly progressing sequence; and wherein for each element in the vector other than the first element, the processing means is configured to determine, based on the vector element value wrapping control information, whether a wrap condition is present, and to generate that element based on whether the wrap condition is present.

* * * * *